US012258805B2

(12) United States Patent
Hofmann et al.

(10) Patent No.: US 12,258,805 B2
(45) Date of Patent: Mar. 25, 2025

(54) TWO-PART HINGE DEVICE, METHOD FOR ADJUSTING A HINGE DEVICE, AND USE OF THE HINGE DEVICE

(71) Applicant: Jansen AG, St. Gallen (CH)

(72) Inventors: Martin Hofmann, Schonenberg (CH); Julian Sturm, St. Gallen (CH); Dominik Eggert, Zurich (CH); Nico Spinelli, Zurich (CH); Uwe Werner, Hutten (CH); Marco Zäch, Diepoldsau (CH); Stefan Brunnschweiler, Rheineck (CH); Ivo Lenherr, Gams (CH)

(73) Assignee: Jansen AG, St. Gallen (CH)

( * ) Notice: Subject to any disclaimer, the term of this patent is extended or adjusted under 35 U.S.C. 154(b) by 311 days.

(21) Appl. No.: 17/884,847

(22) Filed: Aug. 10, 2022

(65) Prior Publication Data

US 2023/0031943 A1  Feb. 2, 2023

Related U.S. Application Data

(63) Continuation-in-part of application No. PCT/IB2021/050911, filed on Feb. 4, 2021.

(30) Foreign Application Priority Data

Feb. 10, 2020 (EP) ..................................... 20156481
Jul. 23, 2020 (EP) ..................................... 20187406

(51) Int. Cl.
*E05D 7/00* (2006.01)
*E05D 5/12* (2006.01)
*E05D 7/04* (2006.01)

(52) U.S. Cl.
CPC ........... *E05D 7/0045* (2013.01); *E05D 5/128* (2013.01); *E05D 7/0423* (2013.01); *E05D 2007/0484* (2013.01)

(58) Field of Classification Search
CPC ................ E05D 7/0045; E05D 7/0054; E05D 2007/0063; E05D 2007/0072;
(Continued)

(56) References Cited

U.S. PATENT DOCUMENTS 128,593 A * 7/1872 Cluff ..................... E05D 7/0407 16/238
516,546 A * 3/1894 McCauley ............ E05D 11/082 16/338
(Continued)

FOREIGN PATENT DOCUMENTS

| | | | |
|---|---|---|---|
| EP | 0 271 053 | A2 | 6/1988 |
| EP | 0 962 616 | A1 | 12/1999 |
| GB | 2 570 737 | A | 8/2019 |

OTHER PUBLICATIONS

International Search Report Corresponding to PCT/IB2021/050911 mailed May 6, 2021.
(Continued)

*Primary Examiner* — Jeffrey O'Brien
(74) *Attorney, Agent, or Firm* — Finch & Maloney PLLC

(57) ABSTRACT

The invention relates to a two-part hinge device for a door or a window, comprising a first housing part (20) and a second housing part (30), which in the assembled state form a door hinge housing (19), and a rod (15) which extends in the first housing part (20) and second housing part (30) along the axial direction (60) thereof, wherein the rod (15) has at least three successive—a first, a second and a third-rod sections (16, 17, 18). The first rod section (16) is supported in the first housing part (20) by a clamping element (50), and the third rod section (18) supports the second housing part (30). In the region of the second rod section (17), the rod (15) is adjustable relative to the first housing part (20) in two directions at an angle to each other and independently of each other, and the two directions at an angle to each other
(Continued)

are arranged transversely to the axial direction (60) of the rod (15).

17 Claims, 17 Drawing Sheets

(58) Field of Classification Search
CPC .......... E05D 2007/0081; E05D 7/0415; E05D 7/0423; E05D 2007/0484; E05D 2007/0492; E05D 5/12; E05D 5/128; E05D 2005/106
USPC .......................................... 16/236, 237, 238
See application file for complete search history.

(56) References Cited

U.S. PATENT DOCUMENTS

| | | | | | |
|---|---|---|---|---|---|
| 1,392,049 | A * | 9/1921 | Dicken | E05D 7/0045 16/239 |
| 2,588,258 | A * | 3/1952 | Lowman | E05D 7/0027 16/243 |
| 3,210,798 | A * | 10/1965 | Tice | E05D 7/0045 16/245 |
| 4,381,580 | A * | 5/1983 | Hellstrom | E05D 7/0027 D8/323 |
| 4,785,498 | A * | 11/1988 | Brotschi | E05D 7/0018 16/382 |
| 5,058,236 | A * | 10/1991 | Henson | E05D 7/0027 16/248 |
| 5,966,778 | A * | 10/1999 | Ray | E05D 11/082 16/338 |
| 6,397,432 | B1 * | 6/2002 | di Vinadio | E05D 7/0054 16/241 |
| 7,162,774 | B1 * | 1/2007 | Von Resch | E05D 7/0054 16/236 |
| 8,528,169 | B1 * | 9/2013 | Yu | E05D 7/043 16/238 |
| 10,669,759 | B2 * | 6/2020 | Lu | E05D 7/0054 |
| 11,072,954 | B2 * | 7/2021 | Hasler | E05D 7/0054 |
| 11,085,215 | B1 * | 8/2021 | VanVolkinburg | E05D 11/02 |
| 12,054,975 | B2 * | 8/2024 | Sampson | E05D 5/128 |
| 12,123,237 | B2 * | 10/2024 | Khalife | E05D 3/02 |
| 2006/0156512 | A1 * | 7/2006 | Naylor | E05D 5/128 16/273 |
| 2008/0083086 | A1 * | 4/2008 | Lin | E05D 5/0246 16/252 |
| 2008/0104798 | A1 * | 5/2008 | Hoppe | E05D 7/0027 16/236 |
| 2008/0104799 | A1 * | 5/2008 | Hoppe | E05D 7/02 16/238 |
| 2015/0330129 | A1 * | 11/2015 | Hendrickson, Jr. | E05D 7/0027 16/244 |
| 2016/0201369 | A1 * | 7/2016 | Criddle | E05D 7/0045 16/238 |
| 2024/0117659 | A1 * | 4/2024 | Trummer | E05D 11/0054 |

OTHER PUBLICATIONS

Written Opinion Corresponding to PCT/IB2021/050911 mailed May 6, 2021.

* cited by examiner

TWO-PART HINGE DEVICE, METHOD FOR ADJUSTING A HINGE DEVICE, AND USE OF THE HINGE DEVICE

This application is a National Stage completion of PCT/IB2021/050911 filed Feb. 4, 2021, which claims priority from European patent application serial nos. 20156481.2 and 20187406.2 filed Feb. 10, 2020 and Jul. 23, 2020 respectively.

FIELD OF THE INVENTION

The invention relates to a two-part hinge device and a method for adjusting the two-part hinge device, and a use of the hinge device according to the independent claims.

BACKGROUND OF THE INVENTION

EP 0962616 B1 discloses a two-part door hinge consisting of two housings which is designed for heavy or wide doors. An adjustment, i.e. a adjustment of the door relative to the door frame is effected by manipulation of the door hinge, by means of eccentric bearing bushings or eccentric bolts. The weight of the door is also brought to bear on the bolts by a pressure plate. EP 0 271 053 A2 discloses a two-part hinge of the same kind for a door or for a window consisting of two housing parts.

The disadvantage of this known solution is that adjusting the door is labour-intensive and not in any way intuitive. Moreover, the construction of the door hinge is complex, and consequently expensive. In particular, the shaping of the eccentric bolt is difficult.

SUMMARY OF THE INVENTION

It is an object of the present invention to resolve one or more drawbacks of the related art. In particular, the objective is to create a two-part hinge device for a door, a gate or a window which enables the door or window to be aligned relative to the frame intuitively, quickly, and consequently economically. It is further intended to provide a method by which intuitive, quick and consequently economical alignment of the door or window relative to the frame is enabled. In addition, the hinge device should be used in such manner that the number of motion cycles with the hinge device is increased.

This object is solved with the apparatus and the method as well as the use defined in the independent claims. Advantageous further developments are described in the figures and the dependent claims.

A two-part hinge device according to the invention for a door, a gate or a window, comprising a first housing part and a second housing part, which in the assembled state form a hinge housing, a rod that extends inside the first housing part and the second housing part along the axial direction thereof, wherein the rod has at least three successive—a first, a second and a third—rod sections. The first rod section is supported in the first housing part by a clamping element and the third rod section supports the second housing part. In the region of the second rod section, the rod is adjustable relative to the first housing part in two directions at an angle to each other and independently of each other, and the two directions extend at an angle to each other transversely to the axial direction of the rod.

Because of its special adjustment capability, the two-part hinge device can be adjusted particularly easily and with a few hand movements by just one person/one fitter without assistance in such a way that the door or window which is fitted on the hinge device can be opened and closed without resistance and reproducibly hundreds of thousands of times. This has the effect of considerably simplifying the installation conditions for a fitter on a construction site or in a workshop, and results in substantial cost savings, since any maintenance of the two-part door hinge can also be carried out by a caretaker or untrained person (with no technical qualification). The rod may be introduced into a first housing opening in the first housing part. The second housing part is in operative connection with the rod, in that it supports the second housing part, as described previously. On the other hand, the third rod section may be introduced into a second housing opening of the second housing part, so that the second housing part is supported in the second housing opening simply and rotatably with respect to the first housing part.

The first housing part and/or the second housing part advantageously contain(s) at least one adjuster for adjusting for height adjustment in extension of the rod. The adjuster for height adjustment is arranged in one of the two housing parts, so that height adjustment is carried out with just a single adjustment mechanism. Alternatively, one adjuster for height adjustment may be provided in each of the two housing parts, so that both housing parts may easily be adjusted relative to each other. The at least one adjuster is in operative connection with the rod, so that is may be used to adjust the distance between the first housing part and the second housing part based on the movement of the rod inside the hinge housing.

In particular, the first housing part and/or the second housing part is/are designed in the shape of droplets and have a flat fastening section for the door plates or door frame plates. Consequently, the hinge device can be fastened to the door or door frame more easily and more firmly.

Alternatively, other positioning elements such as screws, pins, bolts or the like are suitable. The rod is adjustable relative to the first housing part in two directions at an angle to each other and independently of each other within a defined range, that of the second rod section, with the result that the two-part hinge device can be adjusted in two spatial directions intuitively and easily, using just the rod. Consequently, it is not necessary to engage a technically trained fitter at the construction site to adjust the two-part hinge device. The respective spindles may be secured in the rod with the aid of chemical securing means, by using Tuflok® or Nytemp® as chemical locking means, for example. Chemical securing means for spindles have a powerful locking effect even at high temperatures.

The rod is preferably embodied as a suspension rod or as a bolt. A bolt has a cylindrical surface, for example, which enables it to be inserted simply and symmetrically in the respective openings of the first housing part and of the second housing part, allowing said housing parts to rotate easily about the axial direction of the rod. A suspension rod is a rod with a movable bearing, which is supported in the hinge housing by at least one point and consequently supports the second housing part efficiently, so that the two-part hinge device can be adjusted easily at least about this point.

The suspension rod preferably has at least one polygonal section on the second rod section. The polygonal section, a solid rectangular section for example, has at least one polygonal cross-section, which is formed symmetrically about the axial direction of the rod. The rod is adjusted relative to the first housing part at the second rod section, wherein the polygonal section comprises a positioning element, for example a screw. This positioning element holds the rod firmly in position and enables the rod to be adjusted relative to one of the housing parts. Alternatively, the second rod section of the suspension rod has a spherical section or a cylindrical section, wherein the respective section comprises at least one positioning element, as described here, so that the suspension rod can easily be inserted in the first housing part and adjusted therein. Alternatively, the second rod section of the suspension rod has a section which has a larger cross-section than the first rod section. Suspension rods of such kind are simple to manufacture and mechanically strong.

The suspension rod advantageously has at least one cylindrical section as the first rod section. The cylindrical section has a cylindrical surface which is formed symmetrically about the axial direction of the rod. The second housing part can easily be rotated about the first rod section, which is designed as a cylindrical section.

The first rod section of the suspension rod advantageously has a polygonal section. The polygonal section on the first rod section of the suspension rod may serve as an antirotation device to prevent the suspension rod from rotating about the axial direction in the first housing part.

The suspension rod advantageously has at least two erosion notches over its longitudinal extension. This lends the suspension rod a bone-like profile, enabling an economy of material and improving the ratio of mass to rigidity. The at least two erosion notches extend at least partly into the first and third rod sections as well as along the entire second rod section, enabling maximum economy of material.

The rod is preferably constructed as a single part. A single-part rod can be produced simply and has intrinsically high mechanical strength, so that any wear or deformation of the rod during use of the hinge device is reduced.

The rod is preferably of two-part construction, wherein the rod consists of a first rod element and a second rod element. Two-part rods enable simpler production, in particular if the formations and/or the materials of the two rod elements are of different designs. The two rod elements have connecting sections, with which the two rod elements can be connected to a rod mechanically, by screwing, for example. The tilt angle in a two-part rod can also be compensated easily, so that the hinge of the door, window or gate remains movable and consequently the hinge can be prevented from canting.

The first rod section is advantageously arranged on the first rod element, and the third rod section is arranged on the second rod element, wherein the second rod includes the first and second rod elements. In this way, the rod can be clamped to the first rod element in the first housing part. Additionally, the second housing part is in a bearing force-operative connection with the second rod element, which enables it to rotate easily and largely without backlash. The adjustment of the rod at both rod elements as described here results in greater flexibility when adjusting the hinge device.

The second rod element preferably comprises a bushing for introducing the force from the second housing part, at least a part of the second rod section being arranged on the bushing. In this configuration, the bushing is arranged immovably on the second rod element and arranged non-rotatably in the axial direction of the rod, and thus also forms and additional part of the rod. The bushing typically consists of a material that is different from the first rod element, in particular a material with a stronger wear and/or mechanical strength behaviour than the first rod element. With the suitable material pairing, the service life of the hinge device is prolonged decisively, because the tribological properties of the two-part hinge device can be optimised.

The suspension rod is advantageously a triaxial ellipsoid. This has the effect of improving the distribution of the load peaks on neuralgic sections of the suspension rod, in particular the second rod section, during use of the hinge device, since the load peaks at these sections are absorbed by a greater quantity of material. Moreover, the first rod section and the second rod section have lower material thickness, and consequently at least the first rod section can be inserted in the bushing easily and the outer diameter of the bushing is reduced. A hinge device with a suspension rod of such kind enables its use for window, gate or door systems according to DIN EN1935:2002 for load cases with a door weight up to 350 kg, for example.

The rod is preferably adjustable in the region of the second rod section by means of positioning elements, which are advantageously spindles. The positioning elements effect a reproducible adjustment of the rod in the directions at an angle to each other. At the same time, a positioning element may be present for each of the two directions at an angle to each other. Spindles may be embodied as screws, such as grub screws, for example, arranged movably along a longitudinal extension of a threaded hole in the second section of the rod. The spindles can be adjusted easily and independently of each other to adjust the rod inside the hinge housing. For this purpose, the second rod section has at least two threaded holes, which extend along said second rod section in directions at an angle to each other and are offset along the axial direction.

The at least two erosion notches on the second rod section advantageously each have a flat area. This makes it easy to insert the positioning elements in the threaded hole, thereby simplifying adjustment of the hinge device.

The rod is preferably secured against undesirable rotation about the axial direction with an antirotation device. This enables the rod to be held non-rotatably in the hinge housing. A polygonal plate, preferably rectangular or octagonal in shape, for example, may serve as the antirotation device and may be embodied as a locking ring. The locking ring, for example a circlip, may be used as a pull-out guard, so that intentional removal of the rod from the hinge housing may be prevented.

The first rod section of the suspension rod advantageously includes a polygonal section. The polygonal section on the first rod section of the suspension rod may serve as an antirotation device, to hold the suspension rod non-rotatably about the axial direction in the first housing part.

The rod is clamped, preferably in the radial direction and advantageously in the axial direction with respect to the first housing part, at the first rod section. In this way, the rod is held immovably in the first housing part at the first rod section, which in turn simplifies alignment of the second housing part and therewith of the door or window with the frame during fitting.

Preferably, at least a first adjustment opening and a further adjustment opening are provided. In this way, the positioning elements are easily accessible, allowing simple adjustment of the rod relative to the first housing part. The first adjustment opening and the further adjustment openings are preferably arranged in two directions offset at an angle to each other.

The first section of the rod preferably has a ball head which fits the clamping element precisely, wherein the clamping element encloses a hollow spherical bearing. In this way, the rod is clamped at a single point inside the hollow spherical bearing and so also inside the first housing part, so that it can be effectively adjusted about this point inside the hollow spherical bearing.

The precisely fitting ball head advantageously has radially arranged polygonal surfaces, wherein a prism-shaped plate is arranged on the hollow spherical bearing. This has the effect of improving load distribution in the first housing part and implementing an antirotation device.

The precisely fitting ball head advantageously has radially arranged polygonal surfaces which engage in a polygonal bearing, for example a prism-shaped bearing. This creates an effective antirotation device while at the same time reducing the number of components.

An antirotation device is advantageously arranged in the ball head to hold the rod non-rotatably about the axial direction inside the first housing part. In this context, the antirotation device may be embodied as a first bolt, at least a portion of which extends through the ball head a portion of which protrudes from the ball head. The protruding portion of the first bolt is in an operative connection with the first housing part, for example in a slotted hole or a groove in the first housing part, so that the rod is held non-rotatably. The first bolt may also function as a pull-out guard, so that it is possible to prevent the rod from being removed from the first housing part inadvertently.

The first bolt is advantageously arranged parallel to at least one of the two directions at an angle to each other, transversely to the axial direction of the rod. This has the effect of providing a pull-out guard that can be produced easily.

Alternatively to this, the first section of the rod includes a polygon head which fits the clamping element precisely, wherein the clamping element encloses a polygonal bearing. Thus, the rod is clamped on multiple sides inside the polygonal bearing and therewith also inside the first housing part, so that the rod is held securely. The polygon head may function as an antirotation device, to hold the rod non-rotatably about the axial direction inside the first housing part.

The rod may preferably be adjusted by means of at least four spindles, wherein one spindle is arranged in each of the first rod section and the third rod section, which have two directions at an angle to each other, and wherein two spindles are arranged in the second rod section, wherein the first spindle in the second rod section is aligned parallel to the spindle of the first rod section, and the second spindle in the second rod section is arranged parallel to the spindle in the third rod section. This enables the rod to be adjusted in such manner that the first housing part is adjustable only in a first spatial direction and the second housing part is adjustable only in another spatial direction. Consequently, adjusting the hinge device is simple, and one person alone is needed, for example a fitter or an individual without specialist training.

In an alternative embodiment of the two-part hinge device according to the invention, the rod is adjustable by means of at least four spindles, wherein one spindle is arranged in each of the first rod section and the third rod section, which have two directions at an angle to each other, and wherein two spindles are arranged in the second rod section, the first spindle in the second rod section being aligned perpendicularly to the spindle of the first rod section, and the second spindle in the second rod section being aligned perpendicularly to the spindle of the third rod section. In this way, the rod is adjustable in such manner that each of the housing parts is adjustable not only in a first spatial direction but also in a further spatial direction. This has the effect of making adjustment of the hinge device more flexible, wherein only one person, for example a fitter, is needed.

The third rod section is preferably embodied as a ball-head bolt, on which the bushing is supported. A ball-head bolt has a spherical end element on the frontal face of rod, the diameter of which may be larger than the diameter of the rod, for example the first rod section. The spherical end element may easily be positioned in the bushing.

Advantageously, an antirotation device is arranged in the ball-head bolt to hold the rod non-rotatably about the axial direction inside the second housing. In this configuration, the antirotation device may be embodied as a second bolt, at least a portion of which extends through the ball-head bolt and a portion of which protrudes from the ball-head bolt. The protruding portion of the second bolt is in an operative connection with the second housing part, so that the rod is held non-rotatably. The second bolt may also function as a pull-out guard, so that it is possible to prevent the rod from being removed from the second housing part inadvertently.

The second bolt is advantageously arranged parallel to at least one of the two directions at an angle to each other, transversely to the axial direction of the rod. This has the effect of providing a pull-out guard that can be produced easily.

Alternatively or additionally, the ball-head bolt comprises bevels for forming an antirotation device, sod that the rod can be fixed non-rotatably about the axial direction inside the second housing part. Alternatively, the ball-head bolt has polygonal surfaces for forming an antirotation device, so that the rod may be held non-rotatably about the axial direction inside the second housing part.

An axial bearing is advantageously introduced between the second housing part and the bushing, thereby creating a simple axial bearing for the rod.

The axial bearing is advantageously arranged in force-fitting manner inside a housing part so that it is held securely in the hinge device.

Alternatively, the axial bearing includes a shoulder and is arranged in the second housing part in form-fitting manner with the aid of a locking means to prevent undesirable shifting in the hinge device.

A method according to the invention for adjusting a hinge device for a door or window, in particular a two-part hinge device for a door, gate or window as described here, wherein a rod is present in the hinge device, which rod comprises at least three rod sections, includes at least the following steps:

Joining a first housing part to a second housing part to form a door hinge housing, wherein a first rod section is arranged inside the first housing part and at least a portion of the third section of the rod is at least partly introduced into an opening in the second housing part;

Adjusting the first housing part relative to the second housing part, wherein the distance between the housing parts is altered thereby;

Adjusting the rod perpendicularly to the axial direction, wherein the adjustment takes place in a second section of the rod, which is arranged between the first rod section and the third rod section, and wherein the rod is adjusted in two directions at an angle to each other and independently of one another.

This method enables intuitive, rapid and consequently economical alignment of the door or window relative to the frame.

The adjustment of the rod in the second rod section is preferably caused by actuating at least two positioning elements.

A use according to the invention of the two-part hinge device described herein is realised when the first housing part is arranged on a pivotable door or gate or window frame or door leaf and the second housing part on an immovable door or gate or window frame.

In such an arrangement, the first section of the rod is supported in the first housing part by the clamping element, and the third section of the rod is supported in the second housing part, with the result that the load in the two-part hinge device is very much more favourable. In this way, the two-part hinge device is producible less expensively and with smaller dimensions, and the number of motion cycles it can perform is increased. When the door or gate or window frame or the door leaf is swung, the rod is only exposed to a static load from the door, the gate or the window, regardless of the opening angle of the door, gate or window.

Further advantages, features and particularities of the invention will be discerned from the following description, in which exemplary embodiments of the invention are described with reference to the drawing.

The list of reference signs is an integral part of the disclosure, in the same way as the technical content of the claims and figures. The figures are described according to their sequential and thematic relationships. The same reference numerals signify identical components, reference numerals with different indices signify functionally equivalent or similar components.

DETAILED DESCRIPTION OF THE PREFERRED EMBODIMENTS

Figure 1:
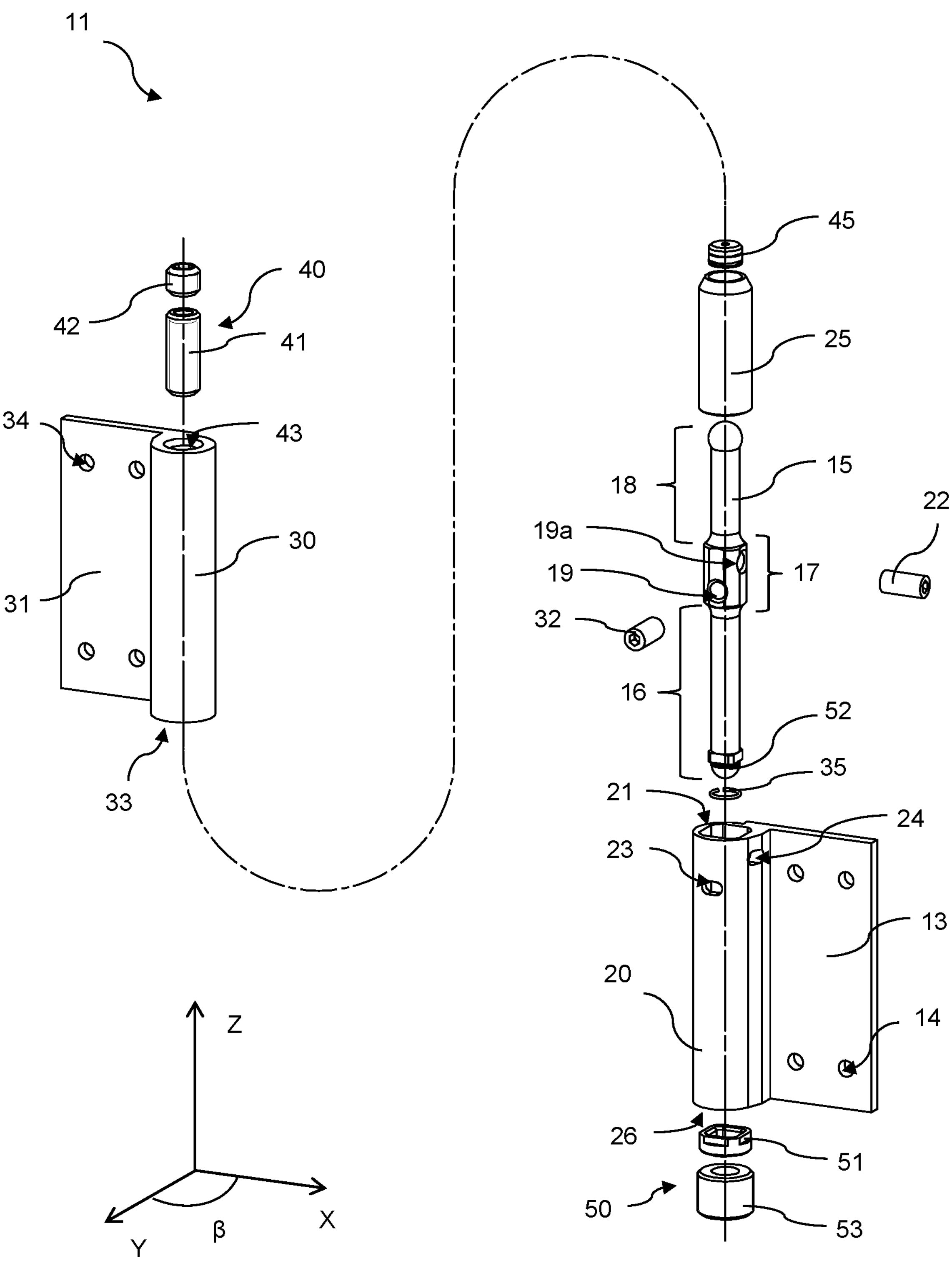
FIG. 1 shows an exploded diagram of a first embodiment of a two-part hinge device according to the invention.

FIGS. 1 to 4 show a two-part hinge device 11 for a door, a gate or a window. The two-part hinge device 11 comprises a first housing part 20 and a second housing part 30, which when assembled form a hinge housing 12. A first flange 13 with openings 14 is arranged on the first housing part 20, wherein the first housing part 20 is fastened to the frame R of a door, window or gate by means of the first flange 13. A second flange 31 with openings 34 is arranged on the second housing part 30, wherein the second housing part 30 is fastened to a door, window or gate by means of the second flange 31. The two-part hinge device 11 comprises a rod which extends inside the first housing part 20 and the second housing part 30 along the axial direction 60 thereof. For this purpose, the first housing part 20 has a first housing opening 21, into which the rod 15 may be introduced. The second housing part 30 has a second housing opening 33, into which the rod 15 may be introduced.

The rod 15 includes three successive—a first, a second and a third—rod sections 16, 17, 18. With the two-part hinge device 11 in the assembled state, the first rod section 16 is supported in the first housing part 20 by a clamping element 50. The third rod section 18 bears a bushing 25 and therewith the second housing part 30, wherein a portion of the third rod section 18 is arranged in the bushing 25. An axial bearing 45 is arranged between the second housing part 30 and the bushing 25. In the region of the second rod section 17, the rod 15 is adjustable relative to the first housing part 20 in two directions X, Y which are at an angle β to each other, wherein the two directions X, Y at an angle β to each other are arranged transversely to the axial direction 60 of the rod 15. The rod 15 is also adjustable in direction X, and in direction Y independently thereof. The two-part hinge device 11 comprises positioning elements for adjusting the rod 15. The positioning elements shown are spindles 22 and 32, each of which has a thread and may be screwed into two threaded holes 19, 19*a* in order to adjust the rod 15. For this purpose, the inner sides of the threaded holes 19, 19*a* are furnished with corresponding threads. The two threaded holes 19, 19*a* extend in two directions X, Y at angle β to each other in the second rod section 17. The rod 15 is clamped in the radial direction with respect to the first housing part 20 at the first rod section 16.

The first housing part 20 has a first adjustment opening 23 and a second adjustment opening 24, which are arranged in two directions X, Y that are offset with respect to one another by angle β. In the assembled state, the rod 15 of the two-part hinge device 11 can be adjusted by means of the spindles 22 and 32 and with a tool, wherein the tool is inserted in the respective adjustment opening 23, 24 to turn or actuate the spindles 22, 32 (not shown). Alternatively, other positioning elements are suitable, for example screws, pins, bolts and the like.

Figure 2:
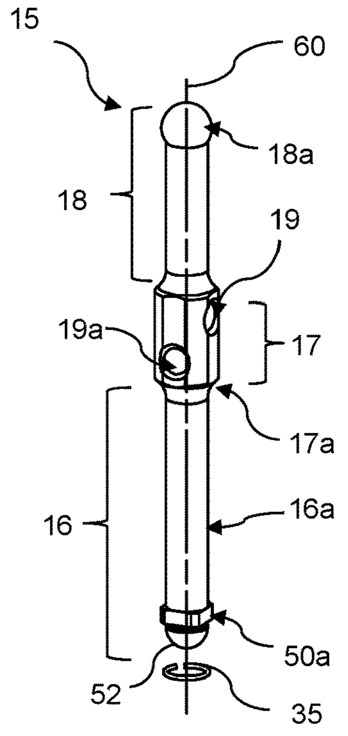
FIG. 2 shows a perspective representation of the two-part hinge device of FIG. 1.

FIG. 2 shows the single-part rod 15, which is embodied as a suspension rod, wherein the suspension rod has at least one polygonal section 17*a* on the second rod section 17. The polygonal section 17*a* has at least one polygonal cross-section, which is designed symmetrically about the axial direction 60 of the rod 15. Adjustment of the rod 15 is effected at the second rod section 17, wherein the polygonal section 17*a* has surfaces in which the threaded holes 19, 19*a* are arranged. The threaded holes 19, 19*a* are located at a distance from each other along the axial direction 60 of the rod 15.

The first rod section 16 of the rod 15 includes a substantially cylindrical section 16*a* and a ball head 52 which precisely fits the clamping element 50, wherein the clamping element 50 comprises a hollow spherical bearing 53. A pull-out guard 35 is also provided, which fixes the rod 15 in the first housing part 20. The hollow spherical bearing 53 is introduced into a bearing opening 26 of the first housing part 20 and fixed in place there. In this way, the rod 15 is clamped at a single point in the hollow spherical bearing 53 and thus also in the first housing part 20. The rod 15 is secured against undesirable axial rotation about the axial direction 60 with an antirotation device 51, wherein the antirotation device 51 is arranged between the first housing part 20 and the hollow spherical bearing 53. For this purpose, the first rod section 16 of the rod 15 has a polygonal section 50*a*. The polygonal section 50*a* on the first rod section 16 holds the rod 15 non-rotatably about the axial direction 60 in the first housing part 20 by cooperating with the antirotation device 51. The third rod section 18 of the rod 15 is embodied as a ball-head bolt 18*a* on which the bushing 25 is supported.

Alternatively, the second rod section of the suspension rod 15 has a spherical section or a cylindrical section, wherein the respective section comprises at least one positioning element, as described herein (not shown). Alternatively, the second rod section of the suspension rod 15 includes a section with a cross-section that is larger than the first rod section (not shown).

Figure 3:
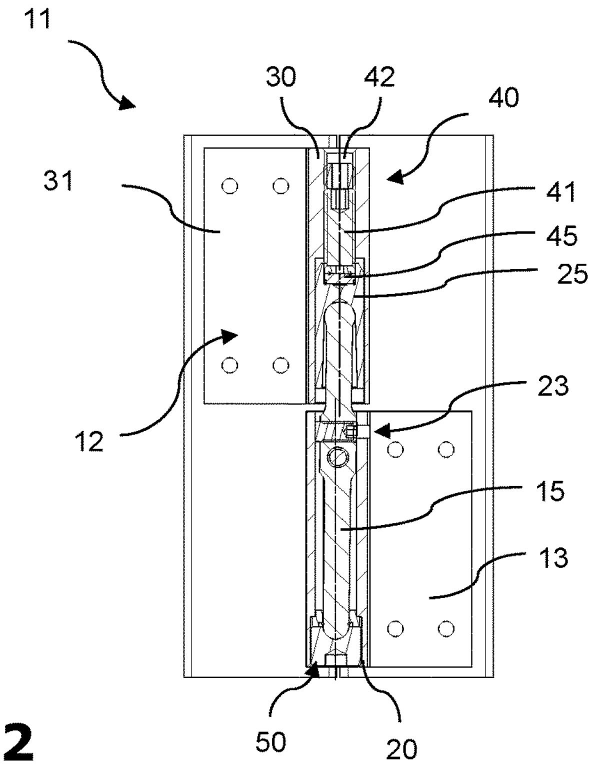
FIG. 3 shows a first cross-sectional representation of the two-part hinge device of FIG. 1.
Figure 4:
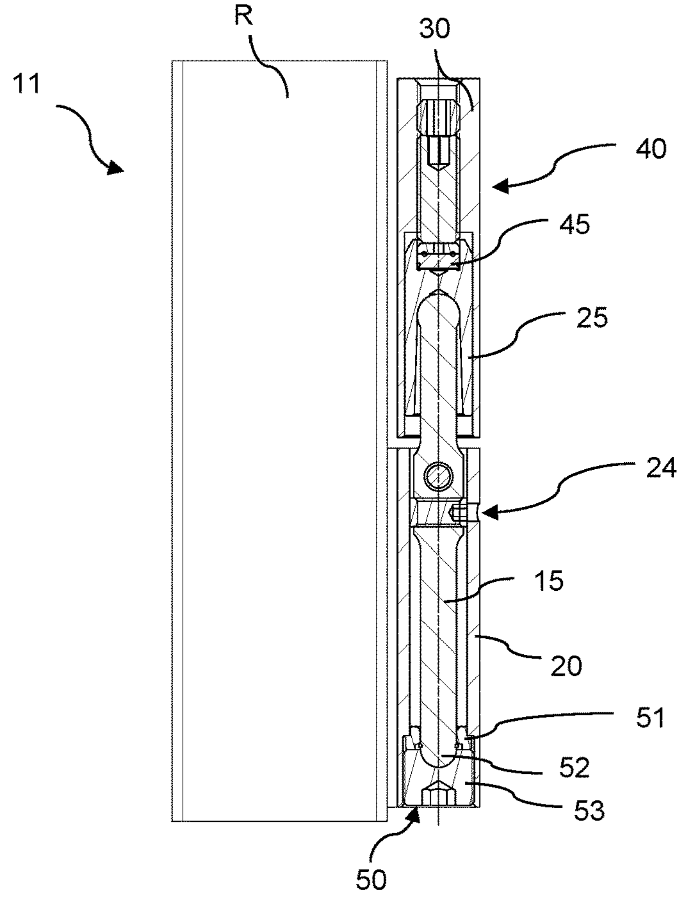
FIG. 4 shows a second cross-sectional representation of the two-part hinge device of FIG. 1.
Figure 5:
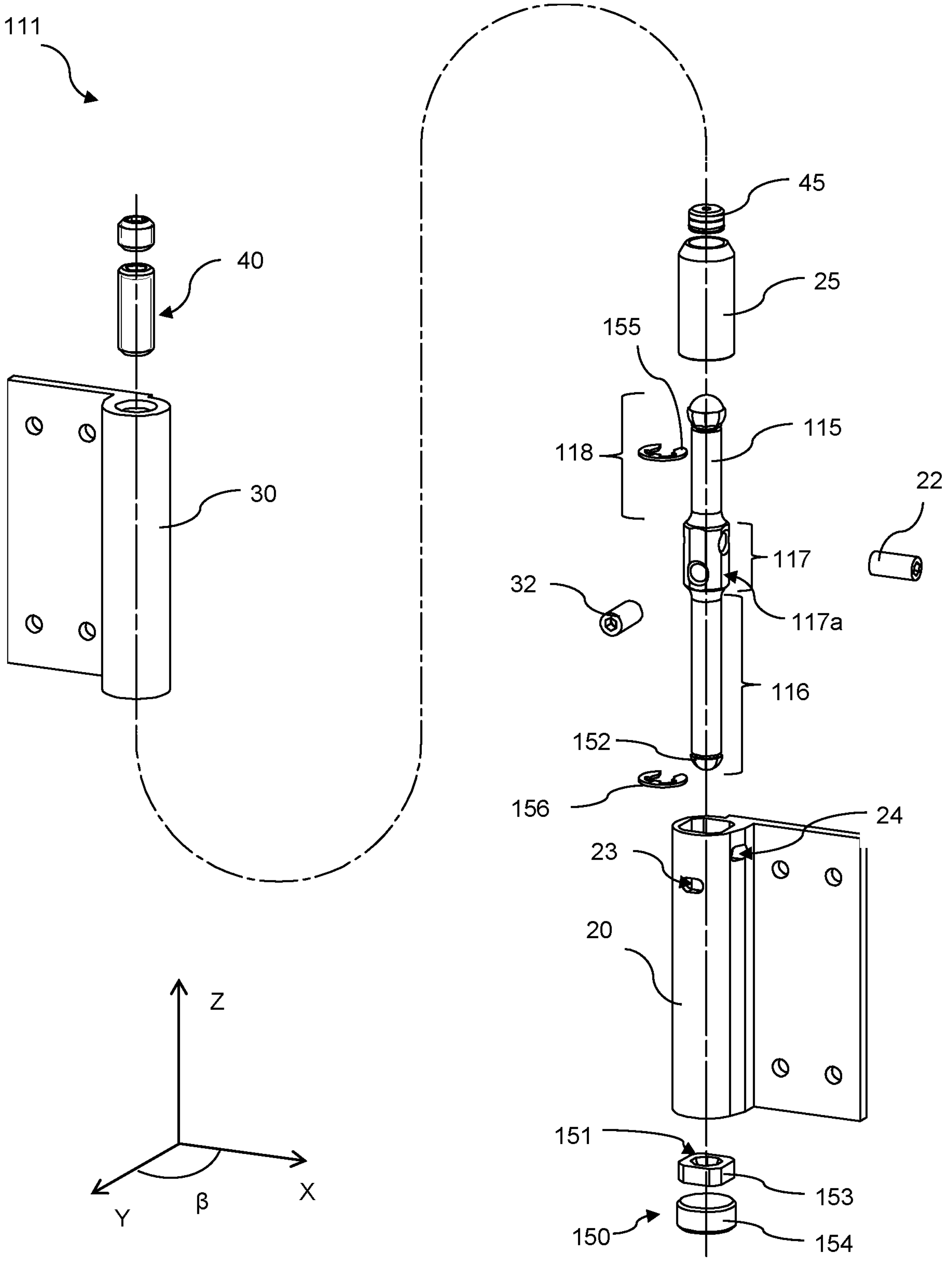
FIG. 5 shows an exploded diagram of a second embodiment of a two-part hinge device according to the invention.

In FIGS. 3 and 4, the two-part hinge device 11 described previously is represented, wherein an adjuster 40 for adjusting height is arranged in the second housing part. The adjuster 40 is arranged in an extension of the rod 15. The adjuster 40 comprises an adjustment member 41 and a threaded adjustment hole 43, in which the adjustment member 41 is arranged so that it can rotate. When the adjustment member 41 is actuated with a tool (not shown), the adjustment member 41 is turned into the threaded adjustment hole 43 and presses against the axial bearing 45, and thus also against the bushing 25, with the result that the two housing parts 20, 30 are adjustable relative to each other in order to adjust the height of the door or window relative to the frame. The adjuster 40 is in operative connection with the rod 15, and consequently the distance between the first housing part 20 and the second housing part 30 is adjustable as a function of the motion of the movement of the rod 15 in the hinge housing 12. The threaded adjustment hole 43 is closable with a cover 42, which in the closed state presses on the adjustment member 41, so that the adjustment member 41 is fixed in place, because it is locked with the cover 42.

FIGS. 5 to 8 show a further embodiment of a two-part hinge device. The two-part hinge device 111 includes substantially the same components as the two-part hinge device 11 according to FIGS. 1 to 4, wherein the two-part hinge device 111 has an alternative rod 115 as well as an alternative clamping element 150, an alternative pull-out guard 155, 156 and an alternative antirotation device 151, 151*a*.

Figure 6:
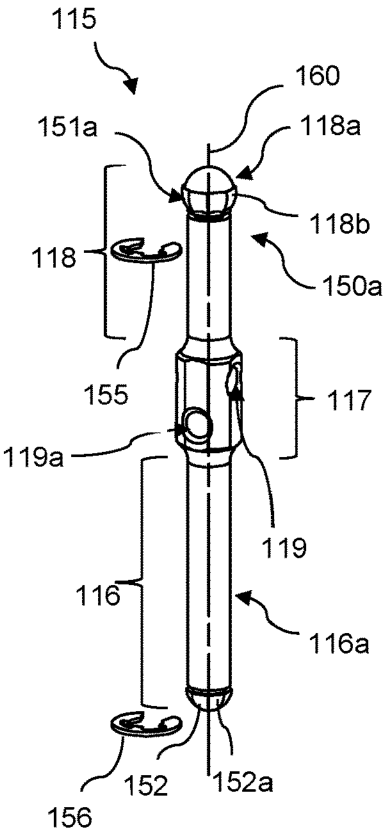
FIG. 6 shows a perspective representation of the rod of the two-part hinge device according to FIG. 5.
Figure 7:
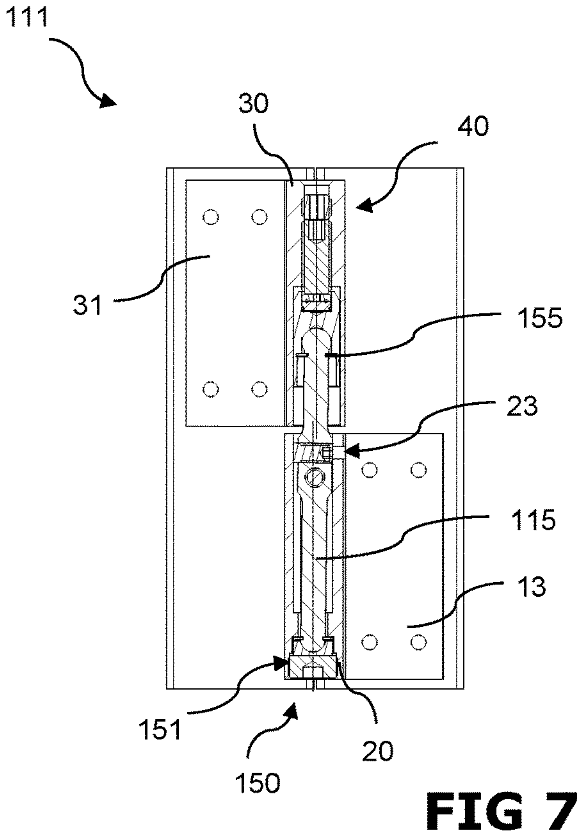
FIG. 7 shows a first cross-sectional representation of the two-part hinge device according to FIG. 5.
Figure 8:
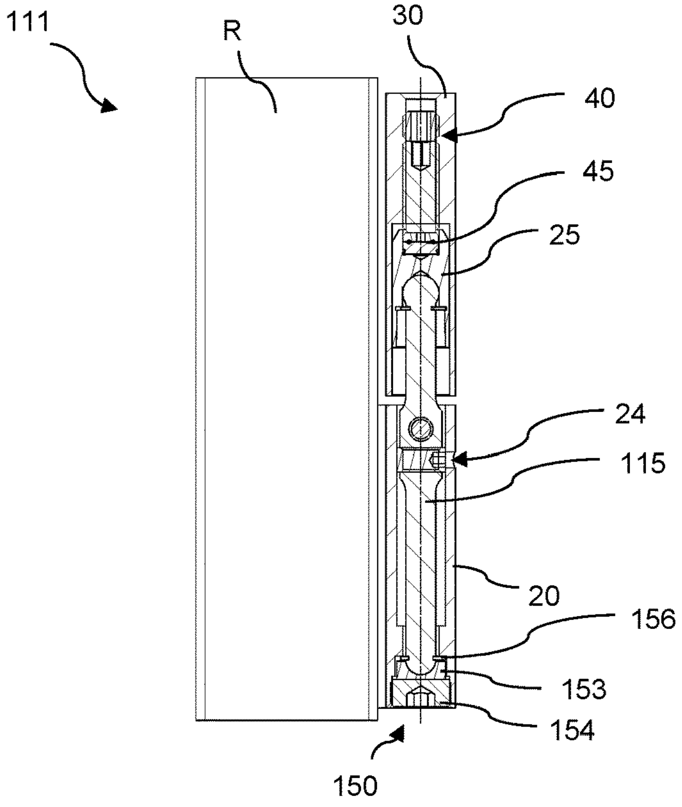
FIG. 8 shows a second cross-sectional representation of the two-part hinge device according to FIG. 5.
Figure 9:
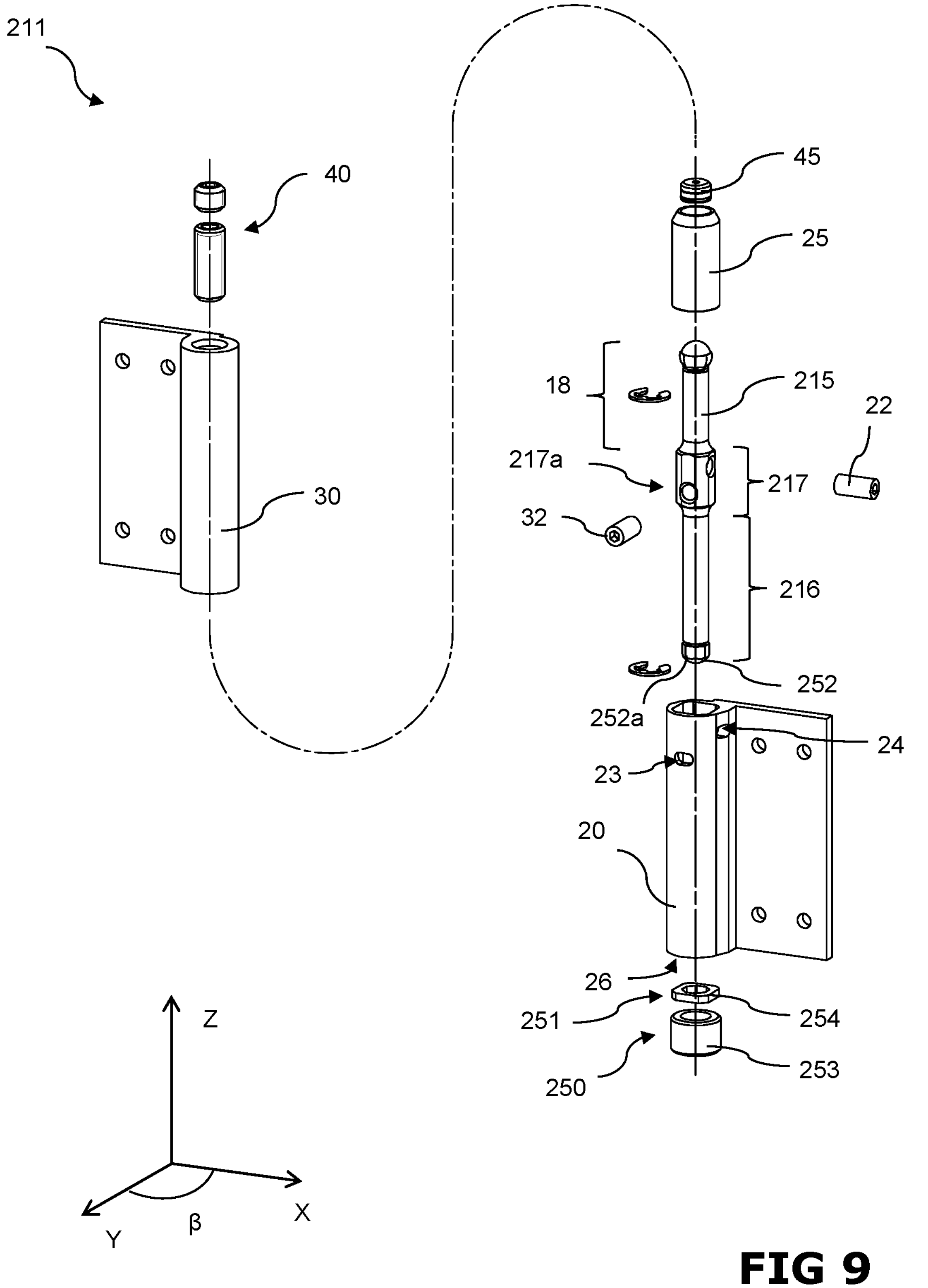
FIG. 9 shows an exploded diagram of a third embodiment of a two-part hinge device according to the invention.
Figure 10:
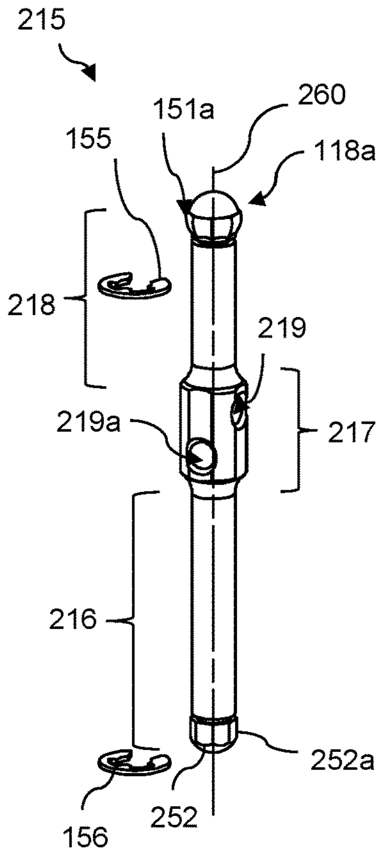
FIG. 10 shows a perspective representation of the rod of the two-part hinge device according to FIG. 9.
Figure 11:
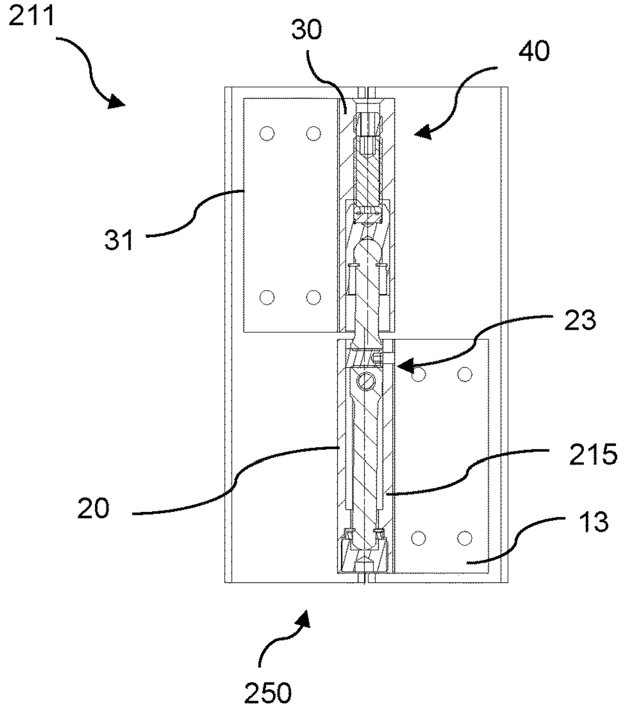
FIG. 11 shows a first cross-sectional representation of the two-part hinge device according to FIG. 9.
Figure 12:
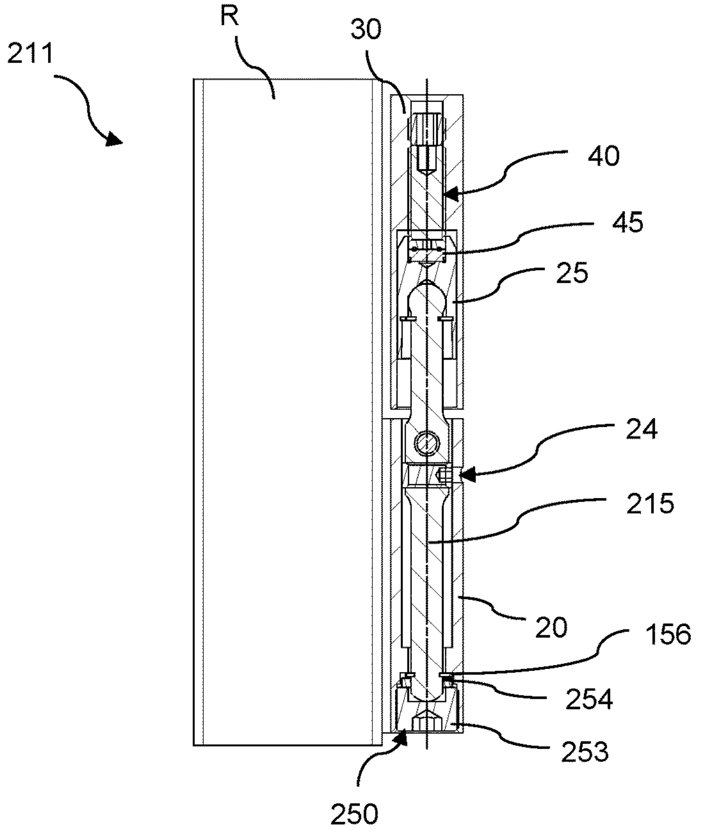
FIG. 12 shows a second cross-sectional representation of the two-part hinge device according to FIG. 9.
Figure 13:
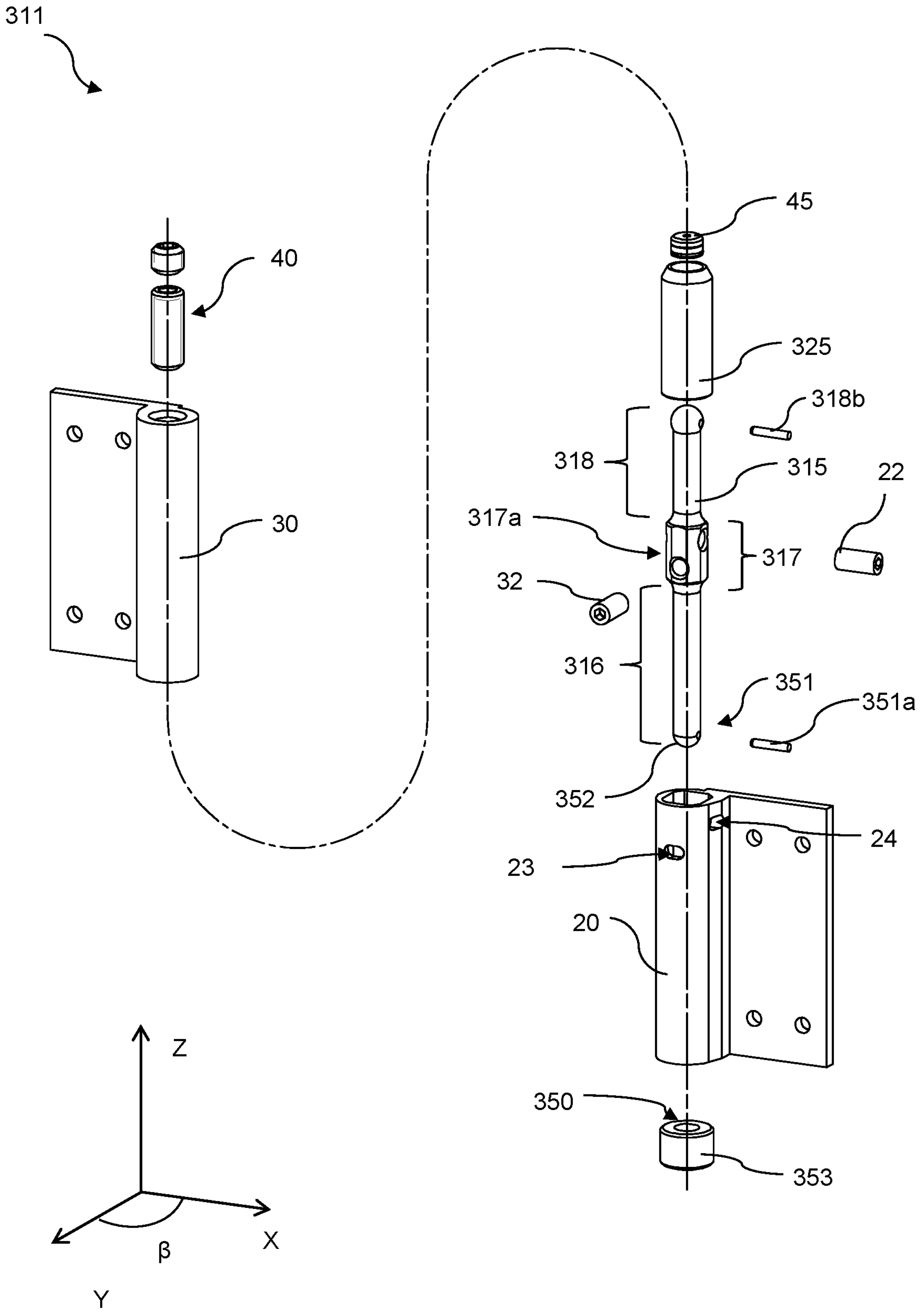
FIG. 13 shows an exploded diagram of a fourth embodiment of a two-part hinge device according to the invention.
Figure 14:
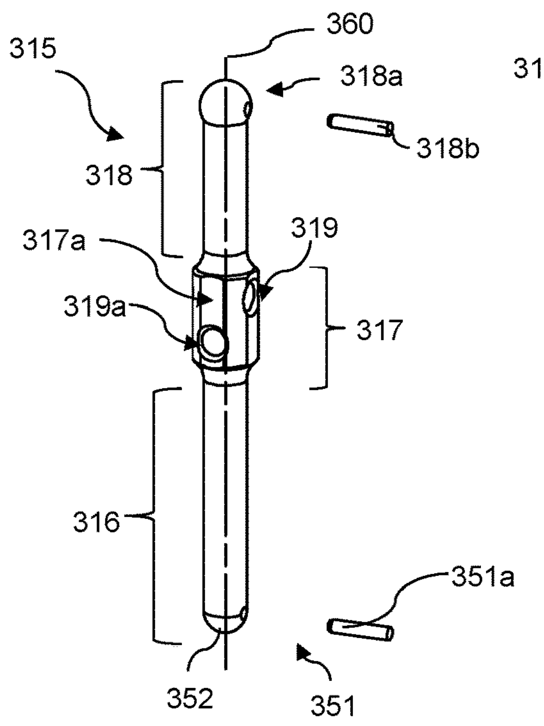
FIG. 14 shows a perspective representation of the rod of the two-part hinge device according to FIG. 13.
Figure 15:
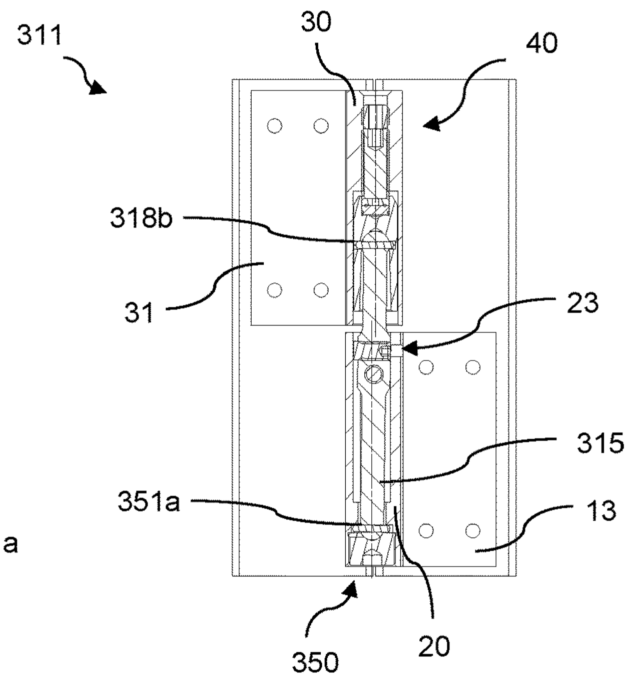
FIG. 15 shows a first cross-sectional representation of the two-part hinge device according to FIG. 13.
Figure 16:
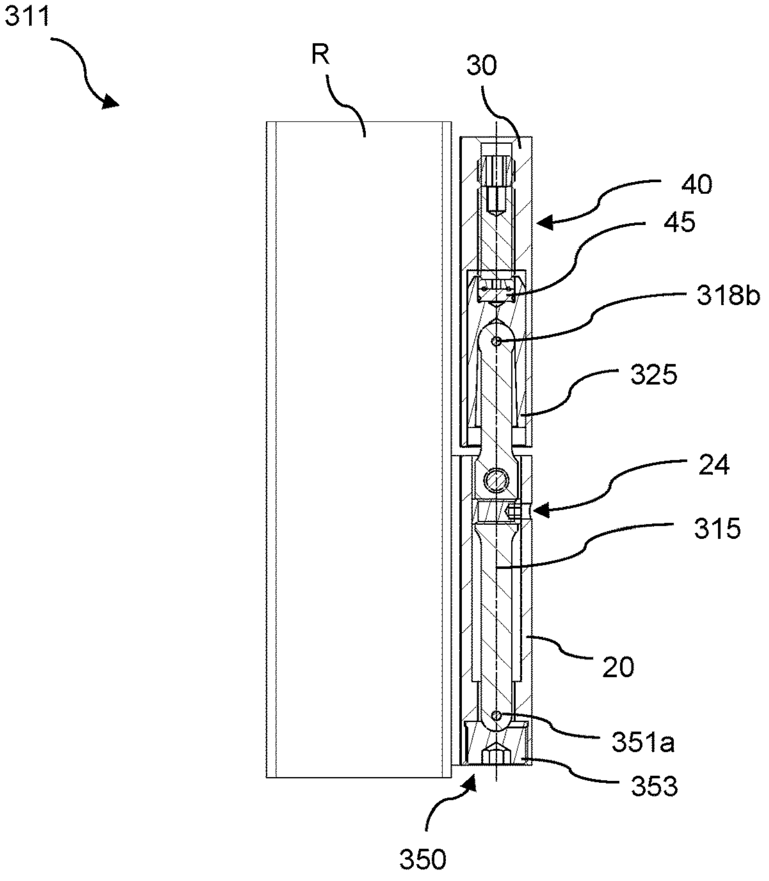
FIG. 16 shows a second cross-sectional representation of the two-part hinge device according to FIG. 13.
Figure 17:
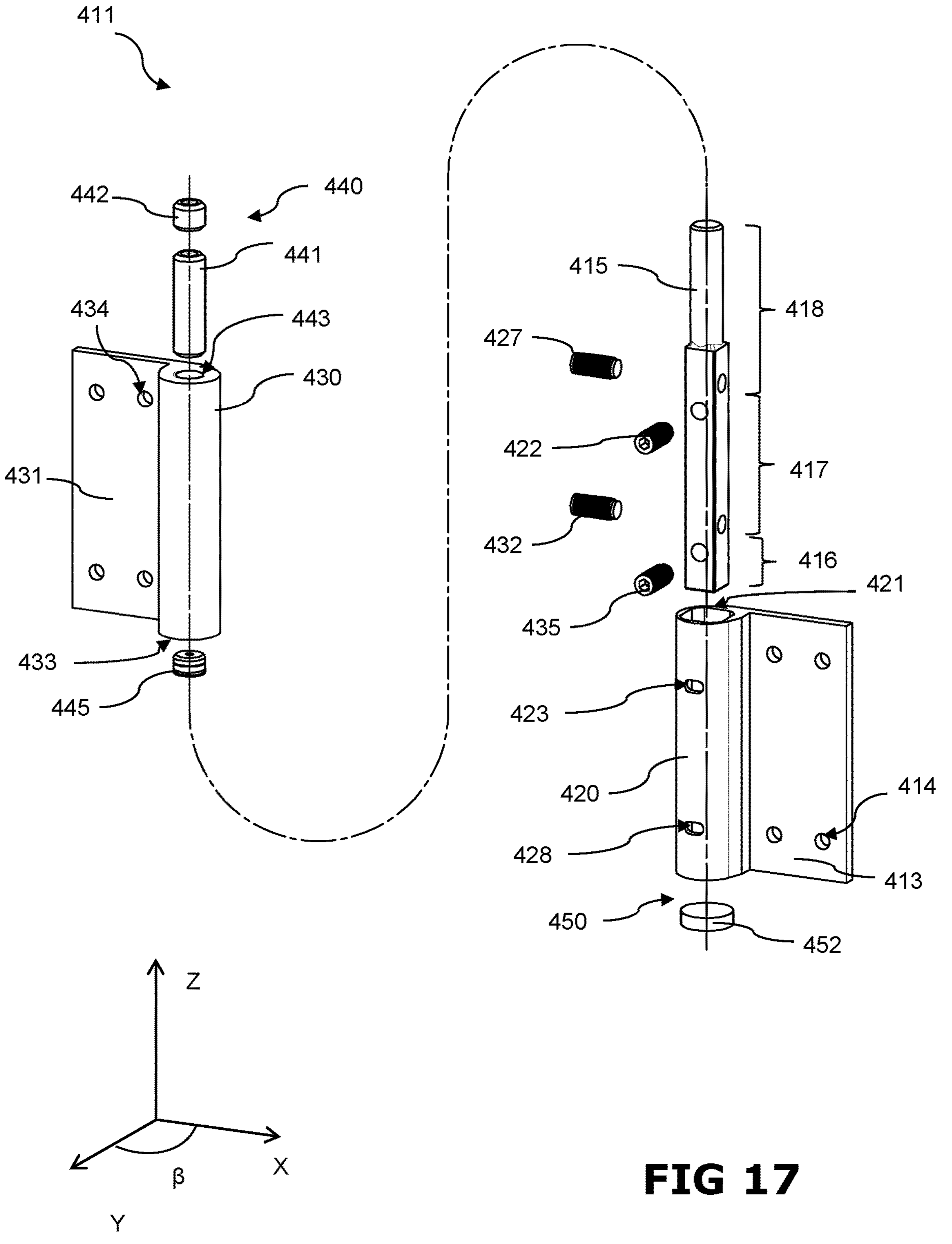
FIG. 17 shows an exploded diagram of a further embodiment of a two-part hinge device according to the invention.

FIG. 6 shows the rod 115 with the three successive—a first, a second and a third—rod sections 116, 117, 118. With the two-part hinge device 111 in the assembled state, the first rod section 116 is supported in the first housing part 20 by a clamping element 150, and the third rod section 118 supports the bushing 25 and thus also the second housing part 30, wherein a portion of the third rod section 118 is arranged inside the bushing 25. The third rod section 118 of the rod 115 is embodied as a ball-head bolt 118*a*, on which the bushing 25 is supported. The ball-head bolt 118*a* comprises bevels 118*b* designed to form an antirotation device 151*a*, so that the rod is held non-rotatably about the axial direction 160 in the second housing part 30. A locking ring is arranged on the third rod section 118 as a first pull-out guard 155, so that the rod 115 cannot be pulled out of the bushing 25. Adjustment of the rod 115 is carried out at the second rod section 117, wherein the polygonal section 117*a* has surfaces in which the threaded holes 119, 119*a* are arranged, as described previously with reference to FIGS. 1 to 4.

The first rod section 116 of the rod 115 has a substantially cylindrical section 116*a* and a polygon head 152 which precisely fits the clamping element 150. The precisely fitting polygon head 152 has radially disposed polygonal surfaces 152*a*, which when assembled engage precisely in a polygonal bearing 153, thereby forming the further antirotation device 151. The clamping device 150 is held in the first housing part 20 by the cover 154. A locking ring is arranged on the first rod section 116 as the second pull-out guard 156.

FIGS. 9 to 12 show a further embodiment of a two-part hinge device. The two-part hinge device 211 includes substantially the same components as the two-part hinge device 11 according to FIGS. 1 to 4 and/or the two-part hinge device 111 according to FIGS. 5 to 8, wherein it has an alternative rod 215 and an alternative clamping element 250.

The rod 215 has three successive—a first, a second and a third—rod sections 216, 217, 218. The rod 215 differs from the rod 115 of FIGS. 5 to 8 in that an alternative, precisely fitting ball head 252 is provided on the first housing section 16. The precisely fitting ball head 252 includes radially arranged polygonal surfaces 252*a*, which in the assembled state fit precisely into a prism-shaped plate 254 as a mating part, so that the precisely fitting ball head 252 is fixed in place by the hollow spherical bearing 253, and the antirotation device 251 is formed. Adjustment of the rod 215 is carried out at the second rod section 217, wherein the polygonal section 217*a* has surfaces in which the threaded holes 219, 219*a* are arranged, as described previously with reference to FIGS. 1 to 4.

FIGS. 13 to 16 show a further embodiment of a two-part hinge device. The two-part hinge device 311 has substantially the same components as the two-part hinge device 11 according to FIGS. 1 to 4, wherein this embodiment has an alternative rod 315, an alternative pull-out which is also designed as an antirotation device 351. Otherwise, the functional and structural properties of the components of the two-part hinge device 311, are designed as described for the two-part hinge device 11 and usable as needed to create an advantageous combination of the two embodiments.

The rod 315 has three successive—a first, a second and a third—rod sections 316, 317, 318. With the two-part hinge device 311 in the assembled state, the first rod section 316 is supported in the first housing part 20 by a clamping element 350. The first rod section 316 of the rod 315 has a ball head 352 which fits precisely in the clamping element 350 and is fixed in place by the hollow spherical bearing 353. Adjustment of the rod 315 is carried out at the second rod section 317, wherein the polygonal section 317*a* has surfaces in which the threaded holes 319, 319*a* are arranged, as described previously with reference to FIGS. 1 to 4.

An antirotation device 351 is arranged inside the ball head 352 to hold the rod 315 non-rotatably about the axial direction 360 in the first housing part 20. In this case, the antirotation device 351 is designed as a first bolt 351*a*, at least a portion of which extends through the ball head 352 and partially protrudes from the ball head 352. The protruding section of the first bolt 351*a* is in operative connection with the first housing part 20, as it extends in an elongated hole or groove in the first housing part 20, and the rod 315 is held in place non-rotatably. The first bolt 351*a* also functions as a pull-out guard.

The third rod section 318 of the rod 315 is also embodied as a ball-head bolt 318*a* on which the bushing 325 is supported. The ball-head bolt 318*a* includes an antirotation device 351, which is in the form of a second bolt 318*b*, at least a portion of which extends through the ball-head bolt 318*a* and a portion of which protrudes from the ball-head bolt 318*a*. The protruding section of the second bolt 318*b* is in operative connection with the bushing 325, as it extends in an elongated hole or a groove, so that the rod 315 is held in place in non-rotatable manner.

FIGS. 17 to 20 show a further embodiment of a two-part hinge device 411 for a door, a gate or a window. The two-part hinge device 411 comprises a first housing part 420 and a second housing part 430, which in the assembled state form a hinge housing 412. A first flange 413 with openings 414 is arranged on the first housing part 420, wherein the first housing part 420 is fastened to the frame R of a door, a window or a gate by means of the first flange 413. A second flange 431 with openings 434 is arranged on the second housing part 430, wherein the second housing part 430 is fastened to a door, a window or a gate by means of the second flange 431.

The two-part hinge device 411 comprises a rod 415, which extends in the first housing part 420 and the second housing part 430 along the axial direction 460 thereof. For this purpose, the first housing part 420 has a first housing opening 421, in which a portion of the rod 415 may be inserted. The second housing part 430 has a second housing opening 433, in which a portion of the rod 415 may be inserted. In this configuration, a bushing such as was used in the embodiments described previously, may be dispensed with.

The rod 415 has three successive—a first, a second and a third—rod sections 416, 417, 418. In the assembled state of the two-part hinge device 411, the first rod section 416 is supported in the first housing part 420 by a clamping element 450. The clamping element 450 comprises a cover 452, on which the first rod section 416 stands. The third rod section 418 supports the second housing part 430. An axial bearing 445 is arranged between the second housing part 430 and the third rod section 418. In the region of the second rod section 417, the rod 415 can be adjusted relative to the first housing part 420 in two directions X, Y at an angle β to each other, wherein the two directions X, Y at an angle β to each other are aligned transversely to the axial direction 460 of the rod 415. In this context, the rod 415 is adjustable in direction X and in direction Y independently thereof. The two-part hinge device 411 comprises positioning elements for adjustment of the rod 415. The positioning elements shown are four spindles 422, 427 and 432, 435, each of which is furnished with a thread. The spindles 422, 427 and 432, 435 can be screwed into and out of the threaded holes 419, 419*a*, 419*b*, 419*c* in order to adjust the rod 415. For this purpose, the insides of the threaded holes 419, 419*a*, 419*b*, 419*c* in the rod 415 are furnished with corresponding threads. The threaded holes 419, 419*a* extend in the second rod section 417 in two directions X, Y at angle β with respect to each other, and the threaded holes 419*b*, 419*c* extend in the first rod section 416 and in the third rod section 418 in two directions X, Y at angle β with respect to each other. In this context, one spindle 435, 427 is arranged in each of the first rod section 416 and the third rod section 418, having two directions X, Y aligned at an angle β with respect to each other, and wherein two spindles 422 and 432 are arranged in the second rod section 417, wherein the first spindle 432 is aligned in the second rod section 417 perpendicularly to the spindle 435 of the first rod section 416, and the second spindle 422 is aligned in the second rod section 417 perpendicularly to the spindle 427 of the third rod section 418.

The first housing part 420 has four adjustment openings 423, 424, 428, 429, wherein the first and second adjustment openings 423, 428 are offset with respect to the third and fourth adjustment openings 424, 429 in two directions X, Y relative to each other by angle β. In the assembled state, the rod 415 of the two-part hinge device 411 may be adjusted by means of the spindles 422, 427 and 432, 435 and with a tool, wherein the tool is inserted in the respective adjustment opening 423, 424, 428, 429 in order to turn or actuate the spindles 422, 427 and 432, 435 (not shown). Alternatively, other positioning elements are suitable, such as screws, pins, bolts and the like.

Figure 18:
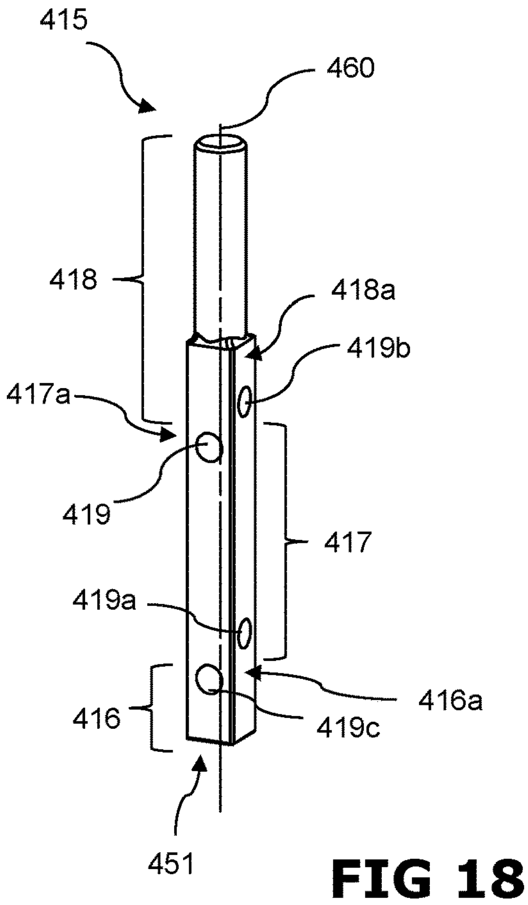
FIG. 18 shows a perspective representation of the rod of the two-part hinge device according to FIG. 17.

FIG. 18 shows the single-part rod 415, which is embodied as a bolt. The rod 415 is secured against undesirable axial rotation about the axial direction 460 with an antirotation device 451, wherein the antirotation device 451 is embodied as polygonal sections 416*a*, 417*a*, 418*a* on the rod 415, which are arranged non-rotatably in the first housing part 420.

Figure 19:
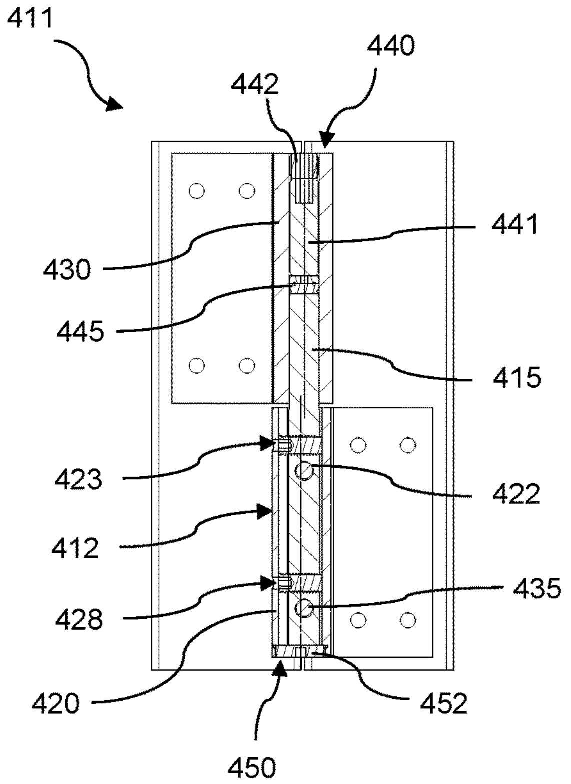
FIG. 19 shows a first cross-sectional representation of the two-part hinge device according to FIG. 17.
Figure 20:
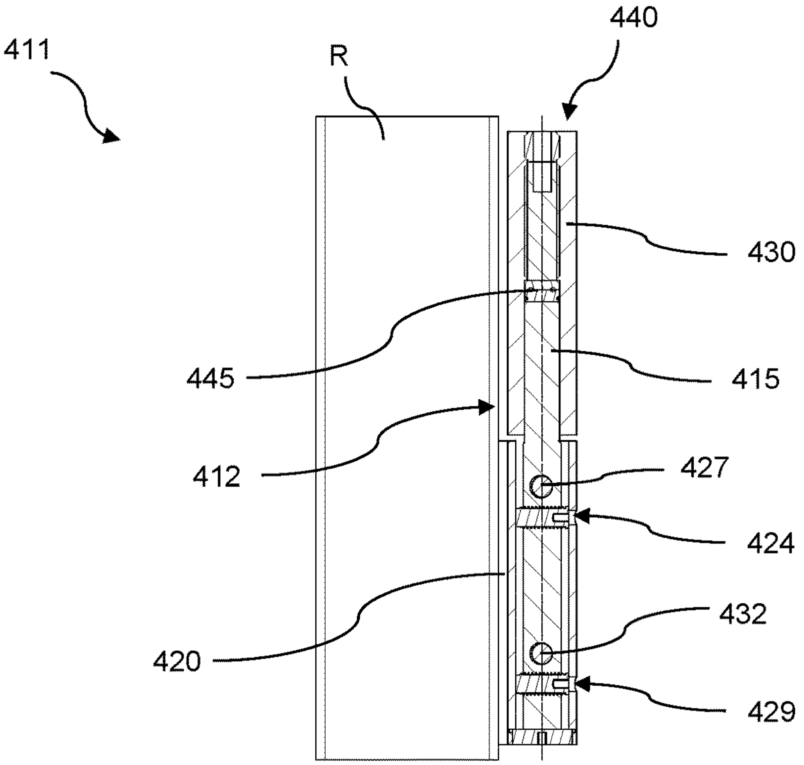
FIG. 20 shows a second cross-sectional representation of the two-part hinge device according to FIG. 17.
Figure 21:
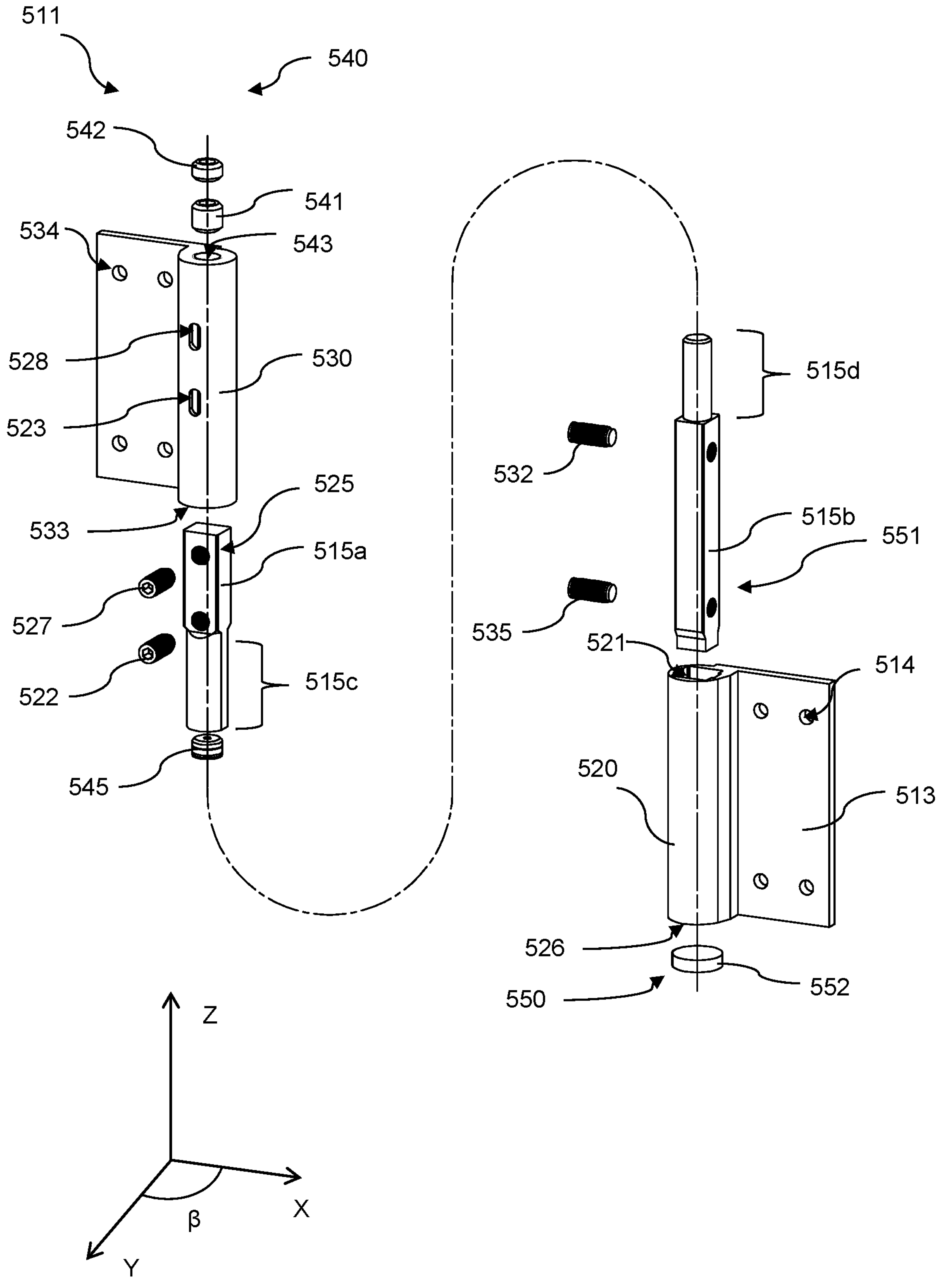
FIG. 21 shows an exploded diagram of a further embodiment of a two-part hinge device according to the invention.

FIGS. 19 and 20 illustrate the two-part hinge device 411 described previously in the assembled state, wherein an adjuster 440 for height adjustment is arranged in the second housing part 430. The adjuster 440 is arranged in extension to the rod 415. The adjuster 440 comprises an adjustment member 441 and a threaded adjustment hole 443, in which the adjustment member 441 is arranged in rotatable manner. When the adjustment member 441 is actuated with a tool (not shown), the adjustment member 441 is turned into the threaded adjustment hole 443 and presses against the axial bearing 445 and therewith also against the rod 416 in the region of the third rod section 418, so that the two housing parts 420, 430 are adjustable with respect to each other, to adjust the height of the door or the windows relative to the frame. The adjuster 440 is in operative connection with the rod 416, with the result that the distance between the first housing part 420 and the second housing part 430 may be adjusted thereby as a function of the movement of the rod 415 inside the hinge housing 412. The threaded adjustment hole 443 is closable with a cover 442, which in the closed state presses on the adjustment member 441, so that the adjustment member 441 is fixed in place.

FIGS. 21 to 24 show a further embodiment of a two-part hinge device 511 for a door, a gate or a window. The two-part hinge device 511 comprises a first housing part 520 and a second housing part 530, which in the assembled state form a hinge housing 512. A first flange 513 with openings 514 is arranged on the first housing part 520, wherein the first housing part 520 is fastened to the frame R of a door, a window or a gate by means of the first flange 513. A second flange 531 with openings 534 is arranged on the second housing part 530, wherein the second housing part 530 is fastened to a door, a window or a gate by means of the second flange 531.

The two-part hinge device 511 comprises a rod 515 which is constructed in two parts. The rod 515 consists of a first rod element 515*a* and a second rod element 515*b*. The two rod elements 515*a*, 515*b* include connecting sections 515*c*, 515*d*, to which the two rod elements 515*a* and 515*b* are joined to form a rod 515. An axial bearing 545 is arranged between the first rod element 515*a* and second rod element 515*b*. In the assembled state, the rod 515 extends in the first housing part 520 and in the second housing part 530 along the axial direction 560 thereof. The first housing part 520 has a first housing opening 521, in which the first rod element 515*a* may be inserted, and the second housing part 530 has a second housing opening 533 in which the second rod element 515*b* may be inserted.

The two-part rod 515 has three successive—a first, a second and a third-rod sections 516, 517, 518. The first rod section 516 is arranged on the first rod element 515*a* and the third rod section 518 is arranged on the second rod element 515*b*, wherein the second rod section 517 includes portions of the first and the second rod elements 515*a*, 515*b* (see FIG. 22). The first rod element 515*a* is embodied as a bushing 525 for introducing the force from the second housing part 530, wherein a portion of the second rod section 517 is arranged on the bushing 525.

The rod elements 515*a*, 515*b* each have two threaded holes 519*a*, 519*b* and 519, 519*c*. The insides of threaded holes 519, 519*a*, 519*b*, 519*c* are furnished with corresponding threads. The threaded holes 519, 519*a* extend in the second rod section 517 in two directions X, Y at an angle β to each other, and the threaded holes 519*b*, 519*c* extend in the third rod section 518 in two directions X, Y at an angle in β to each other.

When the two-part hinge device 511 is in the assembled state, the first rod section 516 is supported in the first housing part 520 by a clamping element 550. The clamping element 550 comprises a cover 552, on which the first rod section 516 stands. The third rod section 518 supports the second housing part 530. In the region of the second rod section 517, the rod 515 is adjustable relative to the first housing part 520 in two directions X, Y at an angle β to each other, wherein the two directions X, Y at an angle β to each other are aligned transversely to the axial direction 560 of the rod 515. The rod 515 is adjustable in direction X and also in direction Y independently thereof. The two-part hinge device 511 comprises positioning elements for adjustment of the rod 515. The positioning elements shown are four spindles 522, 527 and 532, 535, each of which is furnished with a thread, and which may be screwed into and out of threaded holes 519, 519*a*, 519*b*, 519*c* for adjusting the rod 515. In this context, one spindle 527, 535 is arranged in each of the first rod section 516 and the third rod section 518, which have two directions X, Y at an angle β to each other, and wherein two spindles 522 and 532 are arranged in the second rod section 517, wherein the first spindle 532 is aligned in the second rod section 517 parallel to the spindle 535 of the first rod section 516 and the second spindle 522 is aligned in the second rod section 517 parallel to the spindle 527 of the third rod section 518.

The first housing part 520 has two adjustment openings 523, 524 and the second housing part 530 has two adjustment openings 528, 529, wherein the first and third adjustment openings 523, 528 are offset with respect to the second and fourth adjustment openings 524, 529 in two directions X, Y at angle β to each other. In the assembled state, the rod 515 of the two-part hinge device 511 is adjustable by means of the spindles 522, 527 and 532, 535 and with a tool, wherein the tool is inserted in the respective adjustment opening 523, 524, 528, 529 in order to turn or actuate the spindles 522, 527 and 532, 535 (not shown). Alternatively, other positioning elements are suitable, such as screws, pins, bolts and the like.

Figure 22:
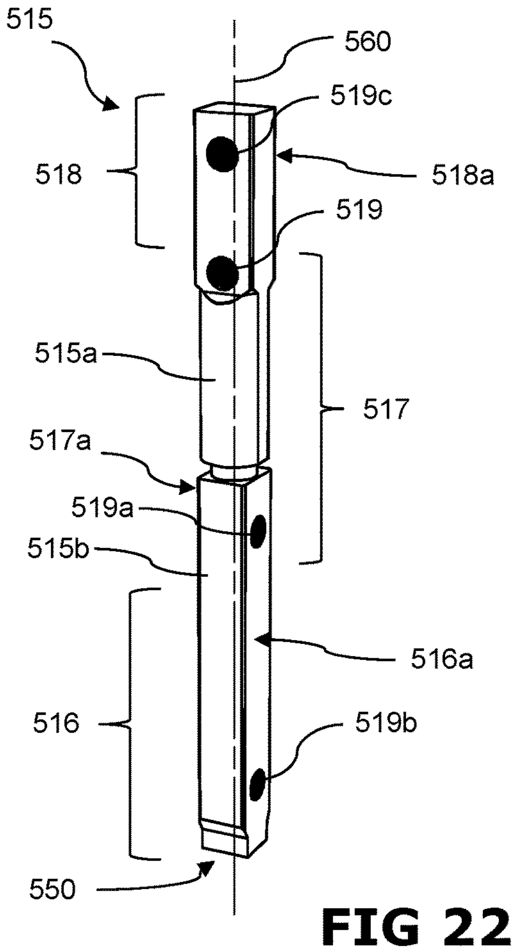
FIG. 22 shows a perspective representation of the rod of the two-part hinge device according to FIG. 21.

FIG. 22 shows the assembled two-part rod 515, which is embodied as a bolt. The rod 515 is secured against undesirable axial rotation about the axial direction 560 with an antirotation device 551, wherein the antirotation device 551 are embodied on the first rod section 516 and on the third rod section 518 as polygonal sections 516*a* and 518*a*.

Figure 23:
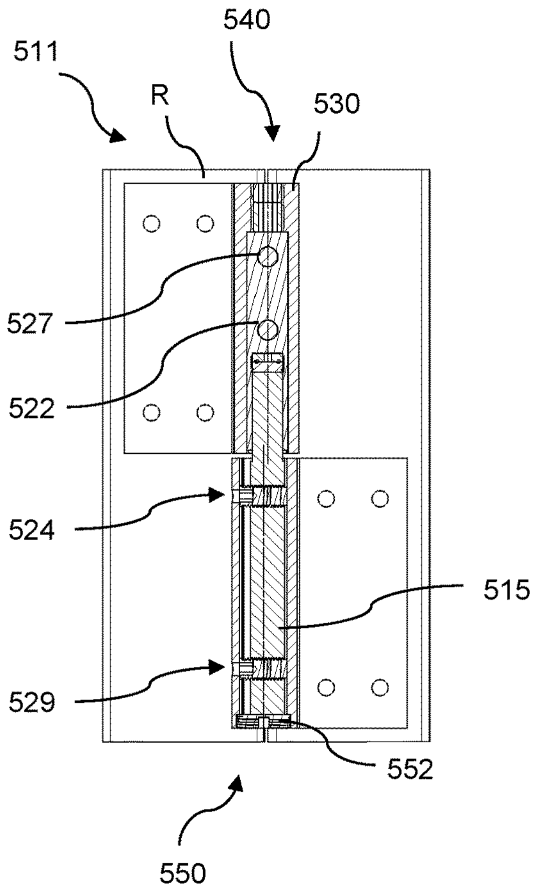
FIG. 23 shows a first cross-sectional representation of the two-part hinge device according to FIG. 21.
Figure 24:
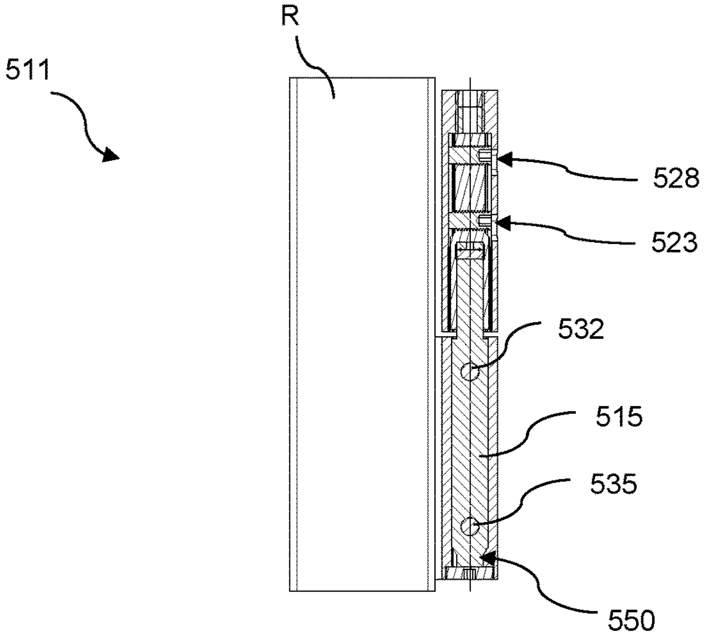
FIG. 24 shows a second cross-sectional representation of the two-part hinge device according to FIG. 21.
Figure 25:
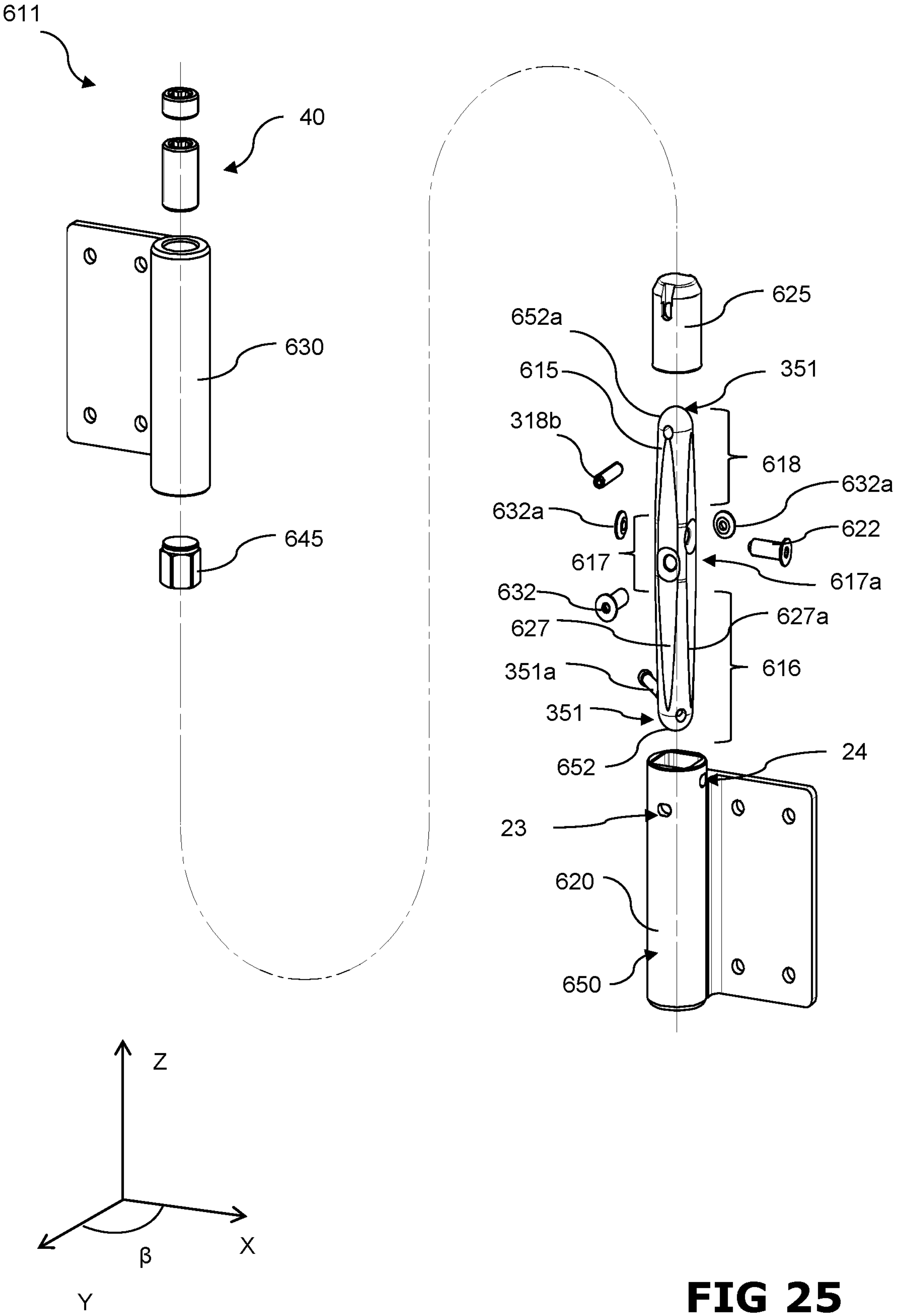
FIG. 25 shows an exploded diagram of a further embodiment of a two-part hinge device according to the invention.
Figure 26:
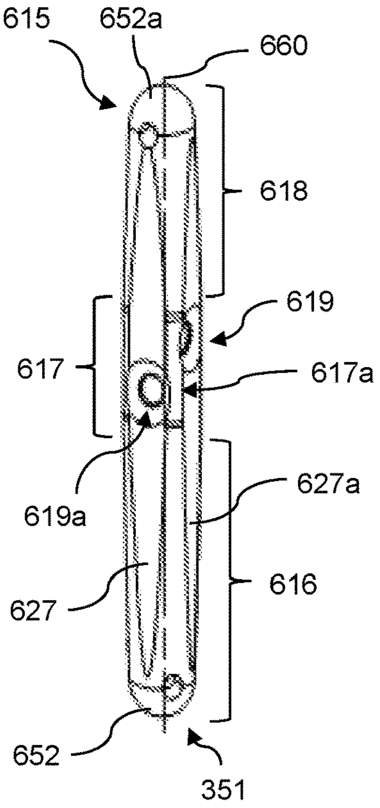
FIG. 26 shows a perspective representation of the rod of the two-part hinge device according to FIG. 25.
Figure 27:
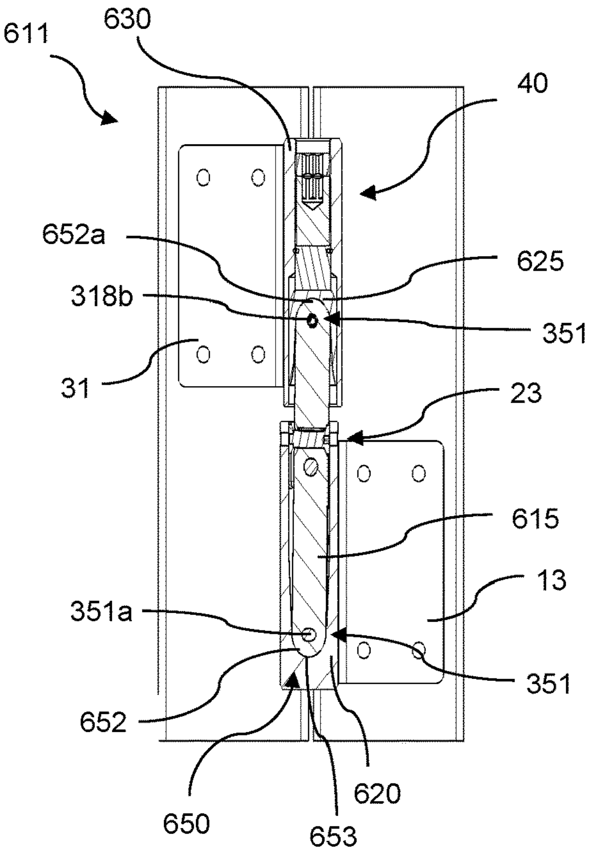
FIG. 27 shows a first cross-sectional representation of the two-part hinge device according to FIG. 25.
Figure 28:
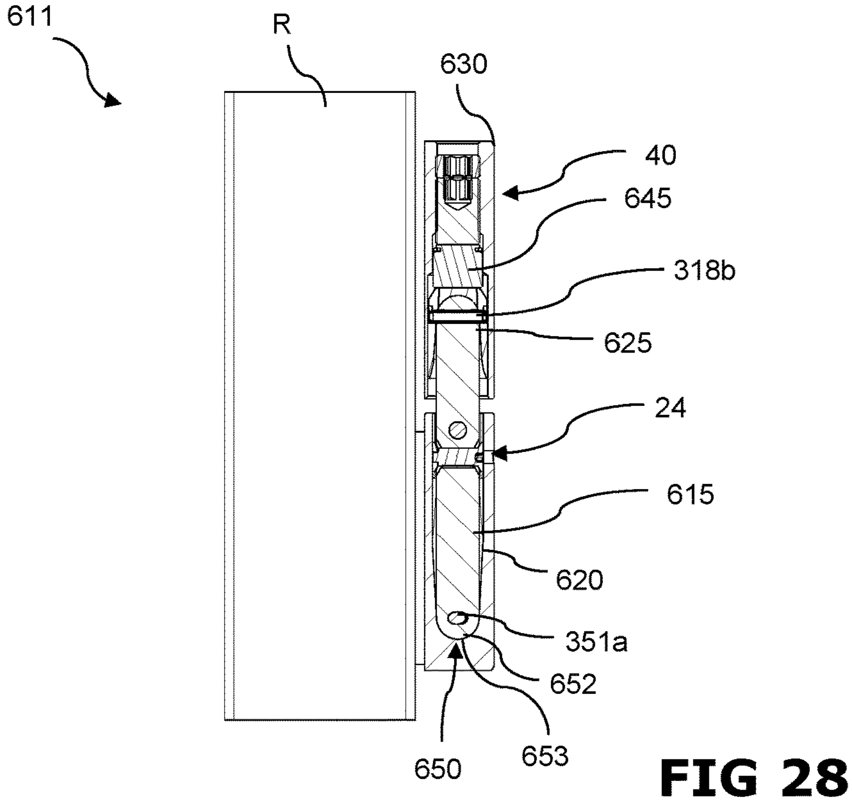
FIG. 28 shows a second cross-sectional representation of the two-part hinge device according to FIG. 25.

FIGS. 23 and 24 illustrate the two-part hinge device 511 described previously, which has an adjuster 540 on the second housing part 530 as in the previously shown embodiments according to FIGS. 1 to 4 or 17 to 20.

FIGS. 25 to 28 show a further embodiment of a two-part hinge device. The two-part hinge device 611 includes substantially the same components as the two-part hinge device 311 according to FIGS. 13 to 16, wherein a alternative rod 615, alternative housing parts 622, 630 and a alternative clamping element are provided. Otherwise, the functional and structural properties of the components of the two-part hinge device 611, are designed as described for the two-part hinge device 311, and usable as needed to create an advantageous combination of the two embodiments.

The rod 615 is a triaxial ellipsoid and has three successive—a first, a second and a third—rod sections 616, 617, 618. When the two-part hinge device 611 is assembled, the first rod section 616 is supported in the hollow spherical housing bearing 653 in the first housing part 620. The first rod section 616 of the rod 615 has a ball head 652 which precisely fits the hollow spherical housing bearing 653. The hollow spherical housing bearing 653 functions as a clamping element 650. Adjustment of the rod 615 is effected at the second rod section 617, wherein the polygonal section 617*a* has surfaces in which the threaded holes 619, 619*a* are arranged, as described previously in FIGS. 1 to 4.

The rod 615 has two erosion notches 627, 627*a* along its longitudinal extension. This lends the suspension rod a bone-like profile, enabling savings in materials. The two erosion notches 627, 627*a* extend at least partly into the first and third rod sections 616, 618 and along the whole of the second rod section 617. The two erosion notches 627, 627*a* each have a flat area in the second rod section, where the spindles 622, 632 engage in the threaded holes 619, 619*a*. The spindles 622, 632 each engage partly in adjusting discs 622*a*, 632*a* to enable the adjustment. Alternatively, the respective spindles 622, 632 may be secured in the rod by means of a chemical securing means, by using Tuflok® or Nytemp® as a chemical locking agent, for example.

The third rod section 618 of the rod 615 is embodied as a precisely fitting (hemi-) spherical head 652*a*, on which the bushing 625 is supported. A non-rotatable axial bearing 645 is arranged between the second housing part 630 and bushing 625. The ball head 652*a* includes an antirotation device 351, in the form of a second bolt 318*b*, at least a portion of which extends through the precisely fitting ball head 652*a* and a portion of which protrudes from the precisely fitting ball head 652*a*. The protruding section of the second bolt 318*b* is in operative connection with the bushing 625, as it extends into an elongated hole or groove with the result that the rod 615 is held in non-rotatable manner.

The method for adjusting a hinge device for a door or a window, in particular one of the two-part hinge devices 11, 111, 211, 311 as described herein for a door, a gate or a window will be described for exemplary purposes with reference to FIGS. 1 to 4. The two-part hinge device 11 comprises the rod 15, which is arranged in the hinge device 11. The method comprises at least the following steps:

Joining a first housing part 20 to a second housing part 30 to form a door hinge housing 12, wherein a first rod section 16 is arranged inside the first housing part 20, and a third rod section 18 of the rod is at least partly introduced into an opening in the second housing part 30;

Adjusting the first housing part 20 relative to the second housing part 30, wherein the distance between the housing parts 20, 30 is altered thereby;

Adjusting the rod 15 perpendicularly to the axial direction 60, wherein the adjustment takes place in a second section 17 of the rod 15, which is arranged between the first rod section 16 and the third rod section 18, and wherein the rod is adjusted in two directions X, Y at an angle β to each other and independently of one another.

The adjustment of the rod 15 in the second rod section 17 is carried out by actuating at least two positioning elements 22, 32.

Figure 29:
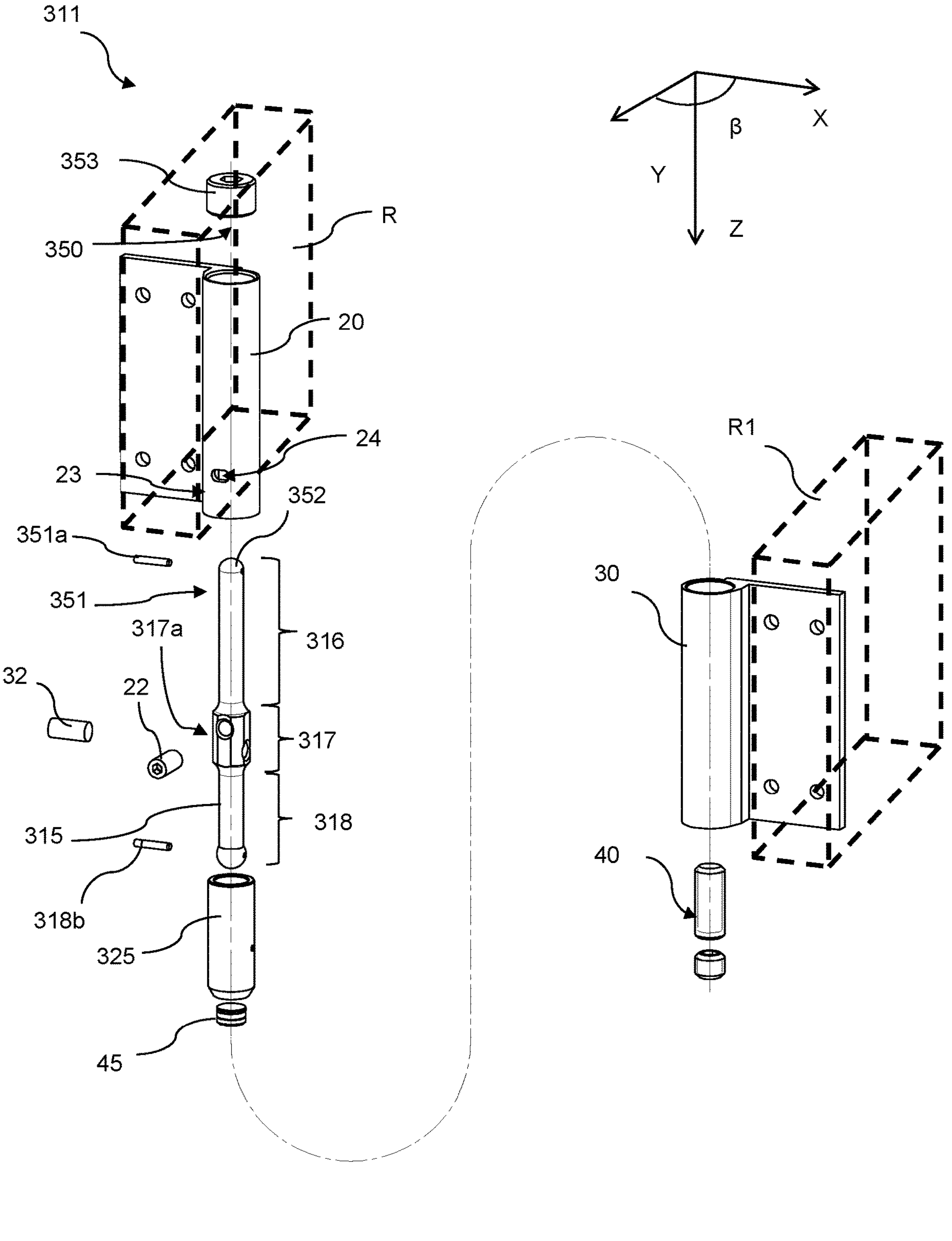
FIG. 29 shows an exploded diagram of the embodiment of the two-part hinge device according to the invention in FIG. 13 in a preferred use.

FIG. 29 shows the preferred use of the two-part hinge devices described herein based on the example of the two-part hinge device 311 according to FIG. 13 to FIG. 16. In this preferred use, the first housing part 20 is arranged on a pivotable door or gate or window frame (or sash) or door leaf R, and the second housing part 30 is arranged on a non-moving door or gate or window frame R1 (or screen frame). In this context, the first rod section 316 of the rod 315 is braced or supported in the first housing part 20 by the clamping element 350, and the third rod section 318 of the rod 315 is braced or supported in the second housing part 30, with the result that the loads in the two-part hinge device 311 are very much more favourable than are represented for example in FIG. 13 to FIG. 16.

Figure 30:
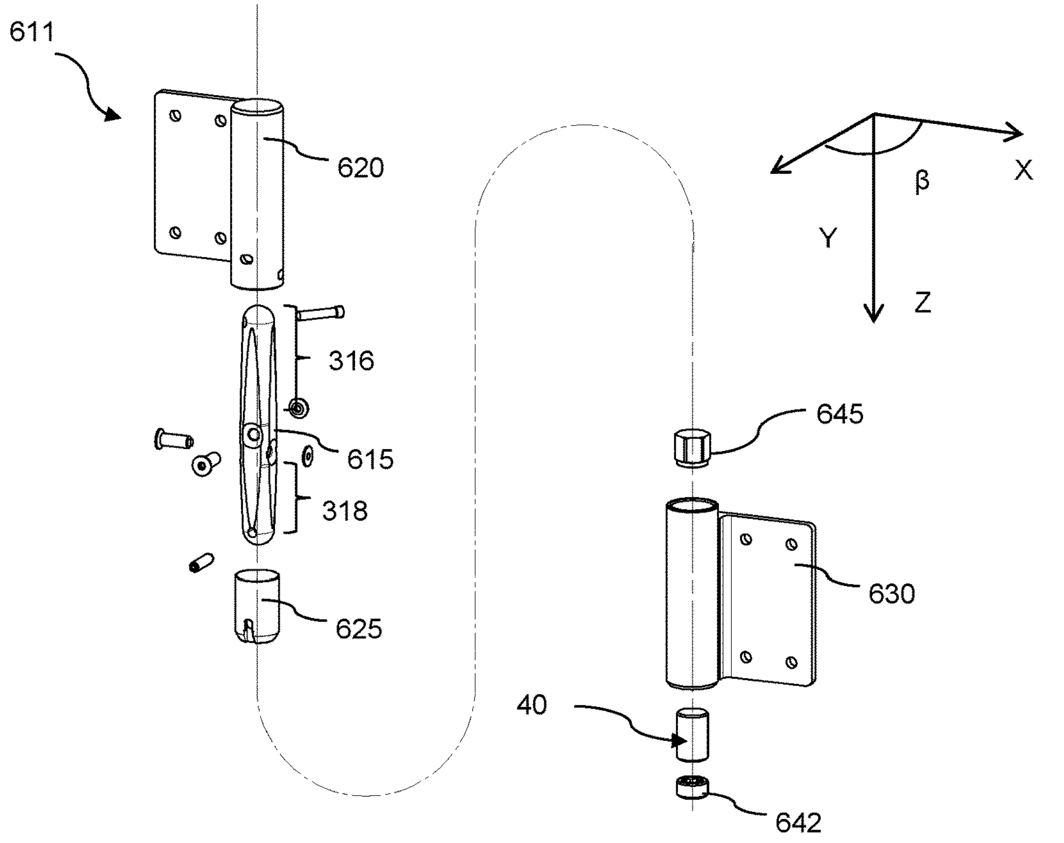
FIG. 30 shows an exploded diagram of the embodiment of the two-part hinge device according to the invention in FIG. 25 in a preferred use.
Figure 31:
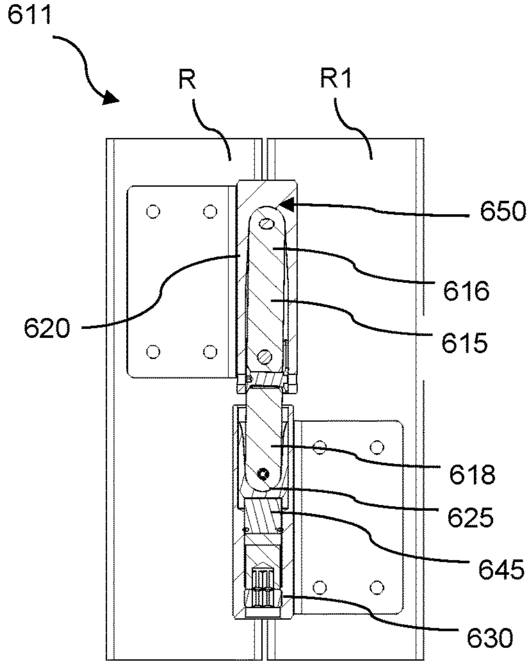
FIG. 31 shows a first cross-sectional representation of the two-part hinge device according to FIG. 30.
Figure 32:
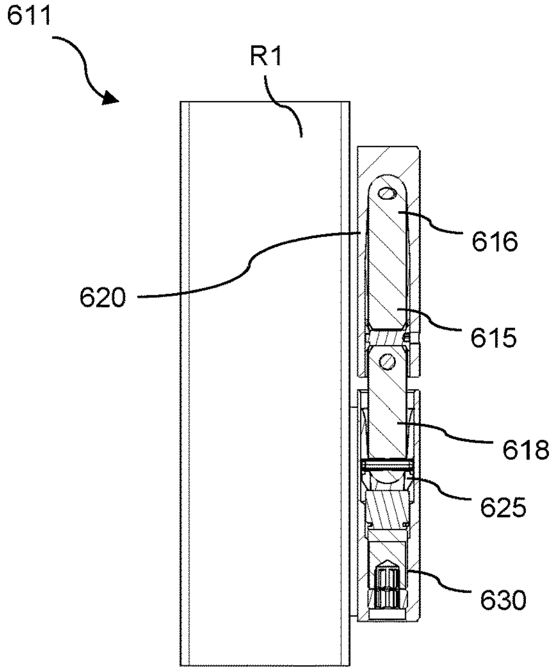
FIG. 32 shows a second cross-sectional representation of the two-part hinge device according to FIG. 30.

FIGS. 30 to 32 show a further preferred used of the two-part hinge devices as described herein base on the example of the two-part hinge device 611 according to FIGS. 25 to 28. In this preferred use, the first housing part 620 is arranged on a pivotable door or gate or window frame (or sash) or door leaf R, and the second housing part 630 is arranged on a non-moving door or gate or window frame R1 (or screen frame). In this context, the first rod section 616 of the rod 615 is braced or supported in the first housing part 620 by the hollow spherical housing bearing 653, and the third rod section 618 of the rod 615 is braced or supported in the second housing part 630 by means of der bushing 625, with the result that the loads in the two-part hinge device 611 are very much more favourable than are represented for example in FIGS. 25 to 28.

Figure 33:
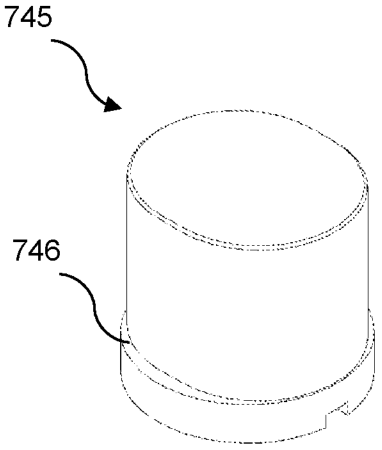
FIG. 33 shows a perspective representation of an axial bearing for one of the hinge devices described previously.
Figure 34:
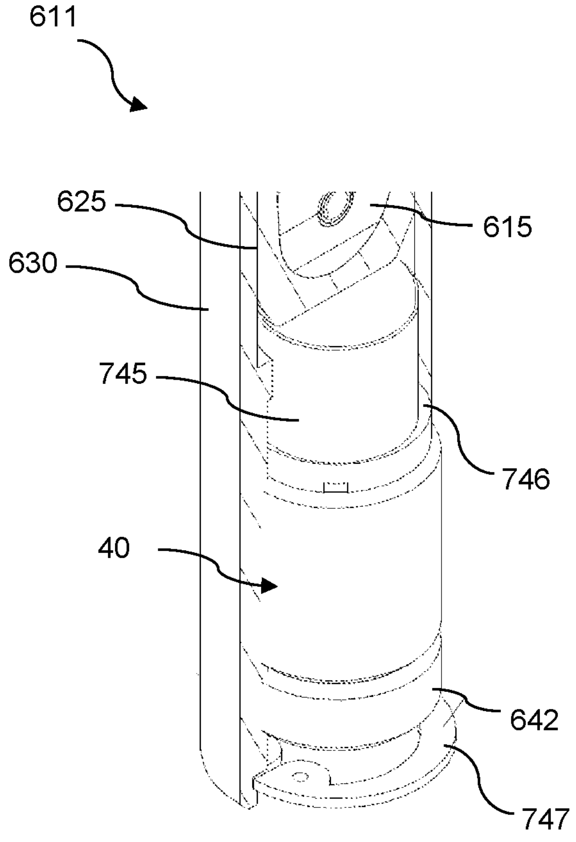
FIG. 34 shows a perspective representation of the axial bearing of FIG. 30 in one of the hinge devices described previously.

FIG. 33 and FIG. 34 show an axial bearing 745 as an alternative embodiment to the axial bearings 45, 445, 545, 645 represented previously, each of which may be installed in the second housing part 30, 330, 430, 530, 630 in force-fitting manner. For example, the axial bearing 745 is installed in form-fitting manner in the second housing part 630 of the hinge device 611 and has a shoulder 746 auf. The axial bearing 745 is fixed in the hinge device 611 by means of a locking ring 747 on the cover 642.

The invention claimed is:

1. A two-part hinge device for a door, a gate or a window, comprising:

a first housing part and a second housing part, which in an assembled state form a hinge housing;

a rod which extends in the first housing part and the second housing part along an axial direction thereof, wherein the rod has at least three successive rod sections including first, second and third rod sections, wherein the first rod section is supported in the first housing part by a clamping element or supports the first housing part, and the third rod section supports the second housing part or is supported in the second housing part, wherein in the region of the second rod section the rod is configured to be adjusted relative to the first housing part in two directions (X, Y) at an angle (β) to each other, independently of each other, and the two directions (X, Y) at an angle (β) to each other are arranged transversely to the axial direction, wherein the rod is adjustable in the region of the second rod section by first and second spindles, wherein the first and second spindles extend respectively in the two directions (X, Y) at an angle (β) to each other, and the first and second spindles are spaced in the axial direction.

2. The hinge device according to claim 1, wherein the rod comprises a suspension rod having at least two erosion notches along the longitudinal extension thereof, and wherein the suspension rod is a triaxial ellipsoid.

3. The hinge device according to claim 1, wherein the rod is constructed as a single part device, or as a two-part device wherein the rod comprises a first rod element and a second rod element.

4. The hinge device according to claim 3, wherein the second rod element comprises a bushing for transferring the force from the second housing part, wherein at least a portion of the second rod section is arranged on the bushing.

5. The hinge device according to claim 1, wherein the rod is secured against undesirable axial rotation about the axial direction with an antirotation device.

6. The hinge device according to claim 1, wherein the rod is clamped in a radial direction with respect to the first housing part by the first rod section.

7. The hinge device according to claim 1, wherein at least a first adjustment opening and a further adjustment opening are present, and are offset in two directions (X, Y) with respect to each other by the angle (β).

8. The hinge device according to claim 5, wherein the first rod section has a ball head which is constructed and arranged to fit the clamping element, wherein the clamping element comprises a hollow spherical bearing.

9. The hinge device according to claim 1, wherein the rod is configured to be further adjusted by third and fourth spindles, wherein the third spindle is arranged in the first rod section and the fourth spindle is in the third rod section, the third and fourth spindles oriented in two directions (X, Y) at an angle to each other, and wherein the first and second spindles are arranged in the second rod section, wherein the first spindle in the second rod section is arranged parallel to the third spindle of the first rod section, and the second spindle in the second rod section is arranged parallel to the fourth spindle of the third rod section.

10. The hinge device according to claim 1, wherein the third rod section comprises a ball-head bolt, on which a bushing is supported.

11. Use of the two-part hinge device according to claim 1, wherein the first housing part is mounted on a pivotable door or gate or window frame or door leaf, and the second housing part is mounted on a non-moving door or gate or window frame.

12. The use of the two-part hinge device according to claim 1, wherein the first housing part is mounted on a non-moving door or gate or window frame, and the second housing part is mounted on a pivotable door or gate or window frame or door leaf.

13. The hinge device according to claim 1, wherein the suspension rod has at least one polygonal section on the second rod section and at least one cylindrical section on the first rod section.

14. The hinge device according to claim 5, wherein the first rod section has a polygonal head that is constructed and arranged to fit the clamping element, wherein the clamping element comprises a polygonal bearing.

15. The hinge device according to claim 14 wherein the polygonal head includes the antirotation device.

16. The hinge device according to claim 1, wherein the rod is configured to be further adjusted by third and fourth spindles, wherein the third spindle is arranged in the first rod section and the fourth spindle is in the third rod section, the third and fourth spindles oriented in two directions (X, Y) at an angle to each other, and wherein the first and second spindles are arranged in the second rod section, wherein the first spindle in the second rod section is aligned perpendicularly to the third spindle of the first rod section, and the second spindle in the second rod section is aligned perpendicularly to the fourth spindle of the third rod section.

17. The hinge device according to claim 8 wherein the ball head includes the antirotation device.

* * * * *